(12) United States Patent
Craig et al.

(10) Patent No.: US 11,769,204 B2
(45) Date of Patent: *Sep. 26, 2023

(54) SYSTEMS AND METHODS OF MATCHING CUSTOMIZABLE DATA TRANSACTION REQUESTS

(71) Applicant: NASDAQ, INC., New York, NY (US)

(72) Inventors: Michael Craig, Wayne, NJ (US);
Thomas Fay, Succasunna, NJ (US);
Dominick Paniscotti, Totowa, NJ (US)

(73) Assignee: NASDAQ, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,712

(22) Filed: Oct. 11, 2022

(65) Prior Publication Data

US 2023/0062530 A1 Mar. 2, 2023

Related U.S. Application Data

(63) Continuation of application No. 16/691,068, filed on Nov. 21, 2019, now Pat. No. 11,494,839.

(60) Provisional application No. 62/770,894, filed on Nov. 23, 2018.

(51) Int. Cl.
*G06F 16/21* (2019.01)
*G06Q 40/04* (2012.01)
*G06F 16/28* (2019.01)

(52) U.S. Cl.
CPC ........... *G06Q 40/04* (2013.01); *G06F 16/212* (2019.01); *G06F 16/288* (2019.01)

(58) Field of Classification Search
CPC ...... G06Q 40/04; G06F 16/212; G06F 16/288
See application file for complete search history.

(56) References Cited

U.S. PATENT DOCUMENTS

| | | | |
|---|---|---|---|
| 6,131,087 A | 10/2000 | Luke et al. | |
| 9,135,612 B1 | 9/2015 | Proctor, Jr. et al. | |
| 10,162,868 B1 * | 12/2018 | Zappella | G06F 16/24578 |
| 2002/0013735 A1 | 1/2002 | Arora et al. | |
| 2002/0099640 A1 | 7/2002 | Lange | |
| 2002/0147670 A1 | 10/2002 | Lange | |
| 2003/0115128 A1 | 6/2003 | Lange | |
| 2003/0236738 A1 * | 12/2003 | Lange | G06Q 40/04 705/37 |
| 2004/0111358 A1 * | 6/2004 | Lange | G07F 17/32 705/37 |

(Continued)

OTHER PUBLICATIONS

Condorelli et al., "Bilateral Trading in Networks", The review of Economic studies, vol. 84, No. 1 (298), pp. 82-105, <https://www.jstor.org/stable/26160268> (2017) (Year: 2017).*

(Continued)

*Primary Examiner* — Matthew J Ellis
(74) *Attorney, Agent, or Firm* — NIXON & VANDERHYE P.C.

(57) ABSTRACT

A computer system is provided that allows participants to submit agent data structures for processing. Each agent data structure includes a valuation function for a first resource and a property of a second resource. The computer system performs a dual sided evaluation process to determine when contra-sided agents match with one another. A match is determined by comparing results of valuation functions of the agent data structures.

20 Claims, 14 Drawing Sheets

---

Agent 250
V = 10*purity *{1.0 for spring, .7 for purified}
Offered: Apples; Machintosh, 50mm Agent 260
V = 8*{1.1 for mac, .8 for delicious}*size/50mm
Offered: Water: Purity 50%, Spring sourced Agent 270
V = 12*purity * {1.1 for spring, .6 for purified}
Offered: Apples: Delicious, 60mm Agent 280
V = 7*{1.2 for mac, .7 for delicious}*size/60mm
Offered: Water: Purity 70%, Purified

(56) References Cited

U.S. PATENT DOCUMENTS

| | | | |
|---|---|---|---|
| 2004/0133526 A1* | 7/2004 | Shmueli | G06Q 30/06 |
| | | | 705/80 |
| 2005/0075962 A1* | 4/2005 | Dunne | G06Q 40/00 |
| | | | 705/36 R |
| 2006/0059082 A1 | 3/2006 | Silverman et al. | |
| 2011/0066536 A1* | 3/2011 | Milne | G06Q 40/04 |
| | | | 705/37 |
| 2017/0103460 A1 | 4/2017 | Golubovsky | |
| 2019/0340013 A1 | 11/2019 | Cella | |
| 2020/0167865 A1 | 5/2020 | Craig et al. | |
| 2020/0258153 A1* | 8/2020 | Tilfors | H04L 9/0643 |
| 2021/0022658 A1* | 1/2021 | Palmer | G06Q 30/0203 |

OTHER PUBLICATIONS

Mathieu Sebastien, "Match-making in Bartering Scenarios", Master's thesis, The University of New Brunswick, Dec. 2005, 100 pages, Retrieved on Jan. 13, 2020 from <http://www.cs.unb.ca/agentmatcher/Bartering/thesis sebastien_mathieu.pdf>.

International Search Report and Written Opinion for International Application No. PCT/US2019/062715, 13 pages, dated Feb. 3, 2020.

International Preliminary Report on Patetability for International Application No. PCT/US2019/062715, 11 pages, dated Jun. 3, 2021.

Blume et al., "Trading Networks with Price-Setting Agents", Jul. 23, 2007, pp. 2-36.

Blume et al., "Trading Networks with Price-Setting Agents", <https://www.cs.cornell.edu/-eva/traders.pdf>, pp. 5-8 (2007).

Condorelli, et al., "Bilateral Trading in Networks", The Review of Economic Studies, vol. 84, No. 1(298), pp. 82-105, <http://www.jstor.org/stable/26160268> (2017).

\* cited by examiner

Agent 250

V = 10*purity *{1.0 for spring, .7 for purified}
Offered: Apples; Machintosh, 50mm

Agent 270

V = 12*purity * {1.1 for spring, .6 for purified}
Offered: Apples: Delicious, 60mm

Agent 260

V = 8*{1.1 for mac, .8 for delicious}*size/50mm
Offered: Water: Purity 50%, Spring sourced

Agent 280

V = 7*{1.2 for mac, .7 for delicious}*size/60mm
Offered: Water: Purity 70%, Purified

Fig. 2B

```
import java.util.ArrayList;
public class UniversalMarket {
    // Create lists to hold the agents
    ArrayList<ApplesForWater> afw = new ArrayList<>();
    ArrayList<WaterForApples> wfa = new ArrayList<>();

public static void main( String[] args ) {
        new UniversalMarket();
    }

Integer getQuantity( ApplesForWater appleGiver, WaterForApples waterGiver, Integer rate ) {
        // The quantity exchanged cannot exceed either parties max
        return Math.min( appleGiver.getMaxGiveUnits( rate ), waterGiver.getMaxGiveUnits() );
    }

UniversalMarket() {
        // Initialize the exchange by adding agents. Agents represent the combination an asset to be 'given' (apples or water) and a formula
        // through which to evaluate the value of an asset received in exchange.
        afw.add( new A1_ApplesForWater() );
        afw.add( new A2_ApplesForWater() );

wfa.add( new W1_WaterForApples() );
        wfa.add( new W2_WaterForApples() );
```

Fig. 5B

```
// Step 1
// Loop over all possible pair-wise combinations of agents.
    Integer afwMatrix[][] = new Integer[ afw.size()] [wfa.size()];
    Integer wfaMatrix[][] = new Integer[ afw.size()] [wfa.size()];

for(int i = 0; i < afw.size(); i++ ) {
    for(int j = 0; j < wfa.size(); j++ ) {
// Compute how many apples apple giver 'i' will give for 1 gallon of water giver 'j's water
        afwMatrix[i][j] = afw.get(i).getApplesPerGallon( wfa.get(j).water.getPurity(), wfa.get(j).water.getSource());

// Compute how many of apple giver 'i's apples water giver 'j' must receive for 1 gallon of j's water
        wfaMatrix[i][j] = wfa.get(j).getApplesPerGallon( afw.get(i).apple.getSize(), afw.get(i).apple.getType());
    }
}
```

Fig. 5C

```
// Step 2
// Find compatible pairs of givers/receivers.  A pair is compatible when both parties are satisfied with the opposite side's valuation of their offering.
// For example, If A is willing to give 10 of his apples for 1 gallon of B's water, and B is willing to accept 10 (or fewer) of
// A's apples for one gallon of his water, then A and B are compatible.
for(int i = 0; i < afw.size(); i++ ) {
    for(int j = 0; j < wfa.size(); j++ ) {
        // Is the apple giver willing to give an equal or greater number of apples than the water giver is willing to accept?
        if( afwMatrix[i][j] >= wfaMatrix[i][j] ) {
            System.out.println("\nMATCH!");
            System.out.println("\tAFW agent " + i + " is willing to give " + afwMatrix[i][j] + " apples for 1 gallon of WFA agent " + j + "'s water");
            System.out.println("\tWFA agent " + j + " is willing to accept " + wfaMatrix[i][j] + " apples from AFW agent " + i + " for a gallon of its water");

// Step 3 - Determine the rate.
            // 'Rate' is the actual number of the variable item (apples) to be exchanged for one of the fixed item (gallon of water). Once the rate is determined, an 'exchange
            // unit' can be defined as the exchange of rate variable items for one fixed item. In this algorithm, the rate is set to the lowest the receiver will accept.
            // For example, if the apple giver is willing to give 10 apples per gallon, but the apple receiver is willing to accept 7 apples per gallon, the rate is set
            // to 7 apples per gallon.  An exchange unit is then defined as the exchange of 7 apples for one gallon. Other rate algorithms (e.g, set rate to the highest
            // the apple giver is willing to give) are possible.
            Integer rate = wfaMatrix[i][j];
            System.out.println("\tRate = " + rate);

// Step 4 - Determine the quantity to exchange. The quantity to exchange is an integer multiple of the exchange unit. (In this example, fractional units are not
            // exchanged. The value equations peg value at specific points; value between these points is unspecified. In this example, it is not valid in general to interpolate.
            // For example, a rate of 8 apples per gallon does not imply that the apple giver would give 4 apples for one half gallon.  The algorithm presented here assumes
            // both givers are limited only by a maximum amount they can give.  We will try to trade as much quantity as possible.  Other algorithms are possible.
            Integer units = getQuantity( afw.get(i), wfa.get(j), rate );
            System.out.println("\tUnits to trade are: " + units);
            System.out.println("\tTRADE: AFW agent " + i + " gives " + units * rate + " apples to WFA agent " + j + " for " + units + " gallons of water");
        } //end if
    } //end for  } //end for  } // end UniversalMarket()
```

Fig. 5D ns of which

SYSTEMS AND METHODS OF MATCHING CUSTOMIZABLE DATA TRANSACTION REQUESTS

CROSS REFERENCE(S) TO RELATED APPLICATION(S)

This application is a continuation of U.S. patent application Ser. No. 16/691,068, filed Nov. 21, 2019, now allowed; which claims priority to U.S. Provisional Application No. 62/770,894, filed Nov. 23, 2018, the entire contents of which are hereby incorporated by reference.

TECHNICAL OVERVIEW

The technology described herein relates to matching data transaction request. More particularly, the technology described herein relates to techniques for handling matching data transaction requests that are customizable and that may include conditional parameters and custom evaluation function.

INTRODUCTION

Different types of exchange systems allow for different types of transactions to be constructed and take place between participants. For example, since at least the time of Adam Smith, a common form of exchange for goods and services is centered around the concept of money (e.g., U.S. Dollars, British Pound, etc. . . . ). Money generally provides the following characteristics that make it attractive in forming transactions between participants: 1) a medium of exchange, 2) a store of value (e.g., generally not being perishable), and 3) a unit or measurement of value. Other types of exchange systems include barter-based systems of exchange.

Automated computer-based systems have attempted to implement some of these exchange systems. For example, automated computer systems may allow multiple participants to submit orders that are then matched against other orders. A typical example may operate by matching a first order to buy 100 shares of stock A@99 dollars to a second order to sell 100 shares of stock A@dollars 99. A match is identified between these two orders because the automated computer system uses money (dollars) to match two (or more) orders to one another to thereby form a transaction. For computer based systems, using money as a unit of exchange can be helpful because the computer can count on being limited to a one-to-many ratio for a given transaction. In other words, the resource that is being traded can use a common medium of exchange.

However, implementing other types of exchange systems (e.g., such as barter systems) on a computer can be difficult because of the exponentially increased number of transaction combinations that may be formed between participants. For example, participants that want to form transactions for oranges and coffee, or water and pears, or lumber and fuel. In such instances, there may be no prior agreed upon medium of exchange, measure of value, or even a store of value to work with for a computer system to attempt at identifying a match. Due to this lack of formalism, it may be difficult to have computer-based systems implement such matching systems because of the relatively undefined nature of the matches being identified and/or the transactions being performed. Accordingly, it will be appreciated that new and improved techniques, systems, and processes are continually sought after in this area of technology.

SUMMARY

In certain example embodiments, agent data structures are submitted to a computer system for matching. The agent data structures may each include a valuation function that is to be used to calculate a value of a first item or resource. The valuation function may be defined with at least one variable property of the first item. Each agent data structure also includes at least one property of a second item. Agents are collected into a pool of agents and then evaluated in a pair-wise manner. In other words, each agent with a valuation function for a first item is evaluated using the at least one property of the first item that is included in another agent. Conversely, each agent with a valuation function for the second item is evaluated using the at least one property of the second item that is included in another agent. The calculated valuations are then reviewed to determine if there are any matches.

In certain example embodiments, a computer system is provided that allows participants to define valuation templates that allow for valuation of a resource (e.g., apples, water, fuel, socks, roses, mowing a neighbor's lawn, etc. . . . ) of their choice in terms of another resource of their choice. Each template may include a function that includes one or more properties or attributes of the resource that is to be valued and sought. Each valuation template may also include the properties of the resource that is to be relinquished or offered in exchange for the resource defined by the valuation function. Each defined valuation template is then stored in the computer system for later use.

The computer system may be programmed to allow participants to submit the agents that use one of the defined valuation templates. Each agent may be an instantiation of a valuation template and thus may include a valuation function for a resource that is being sought and the properties of a resource that the participant is relinquishing.

The value of the valuation function in each agent may be calculated using properties of at least one (or all) properties from opposing agent(s). A matching engine may be executed over the calculated values from each valuation function to determine which agents (if any) are matchable against one another. Agents that do match may then form a transaction that involves the resources defined by the two (or more) agents.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIG. 2B illustrates examples of different agents that may be submitted to the computer system shown in FIG. 1;

FIGS. 5B-5D are code snippets from an example computer application program that implements a technique for evaluating and matching agents according to certain example embodiments;

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

Figure 1:
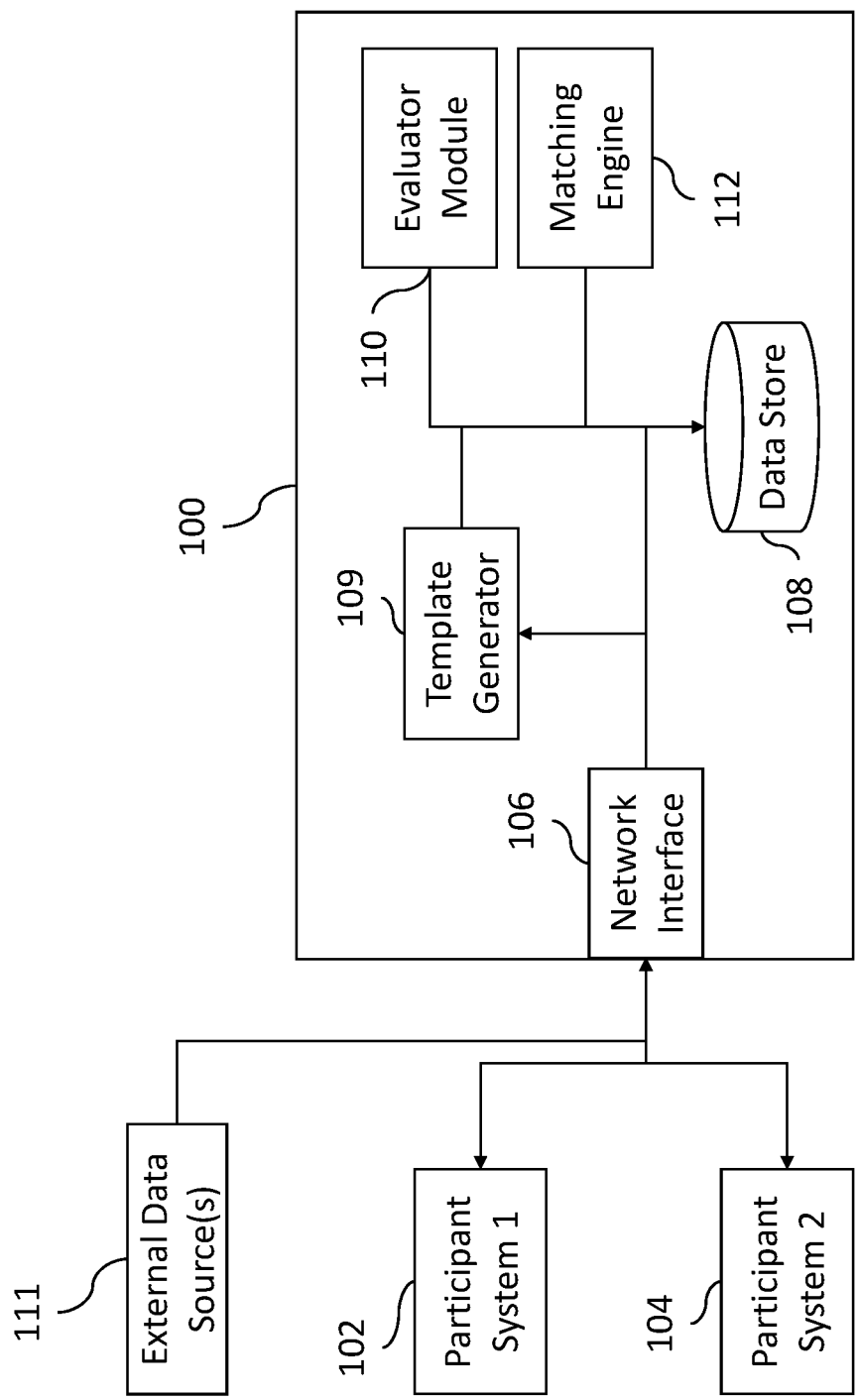
FIG. 1 is a diagram for an example computer system that handles customizable data transaction requests according to certain example embodiments.
Figure 2A:
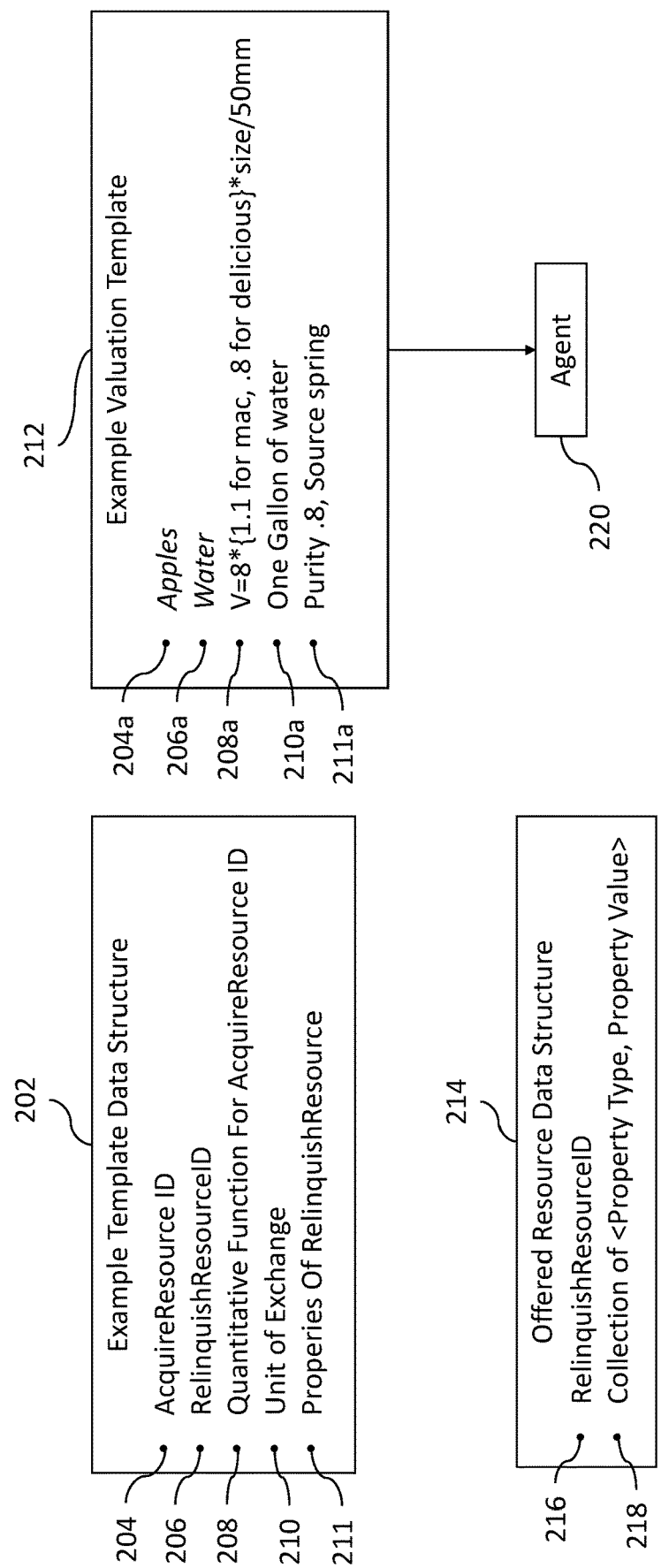
FIG. 2A illustrates example data structures that are used by the computer system shown in FIG. 1.
Figure 3:
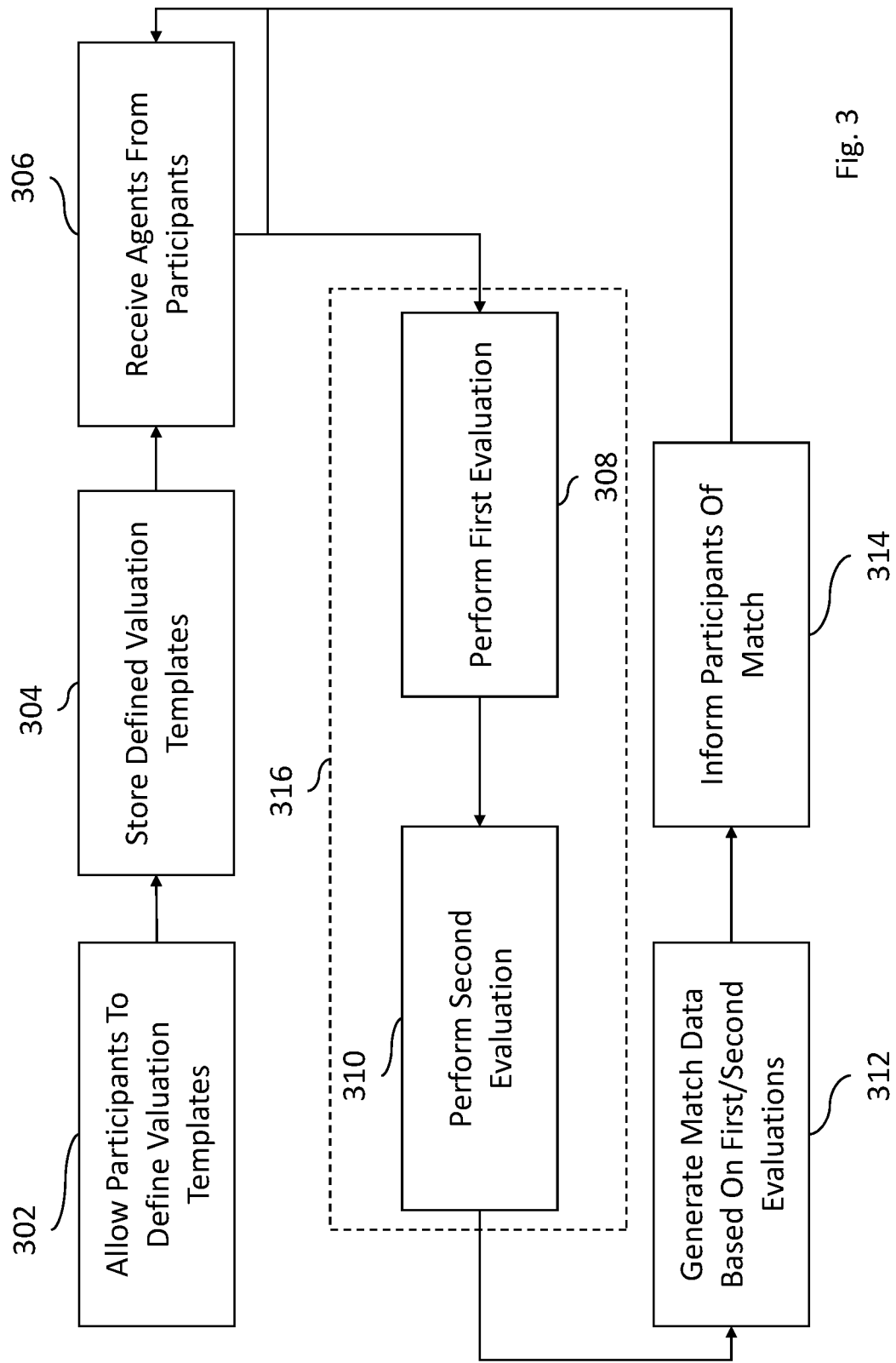
FIG. 3 is an example process that is used by the system in FIG. 1 to process customizable data transaction requests according to certain example embodiments.
Figure 4:
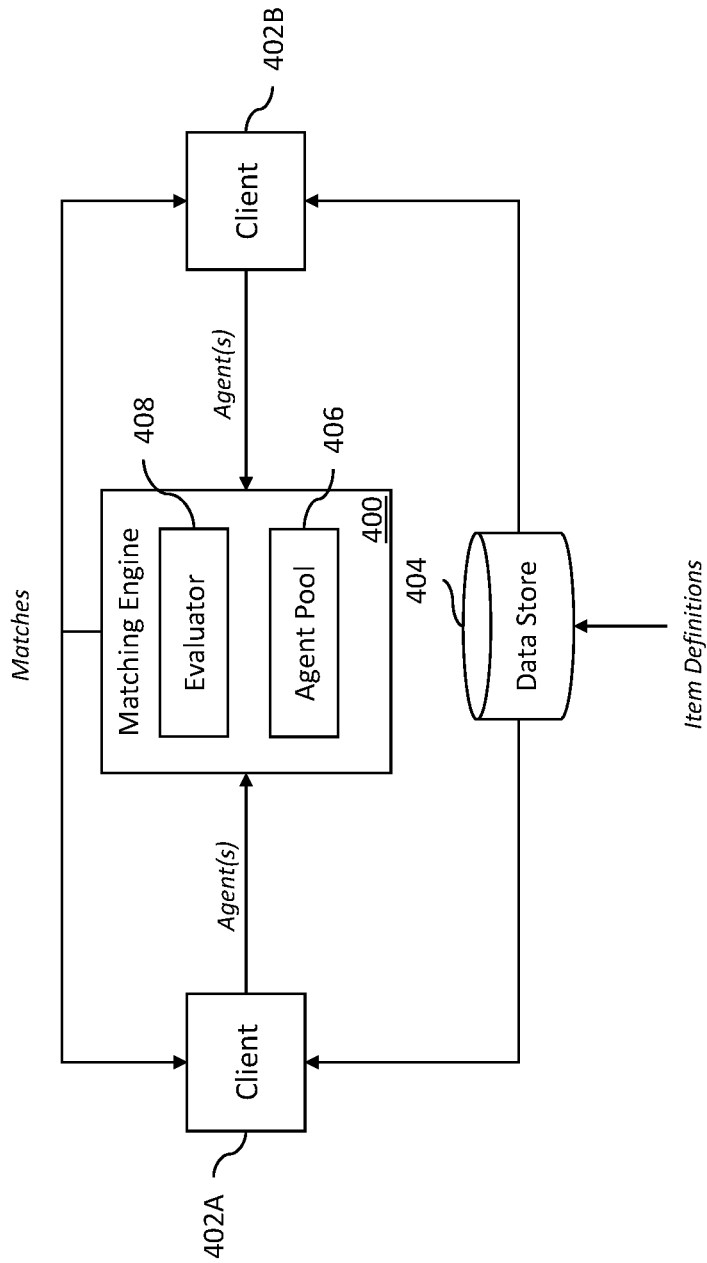
FIG. 4 shows a diagram of an example computer system that is used to evaluate and match agents according to certain example embodiments.
Figure 6A:
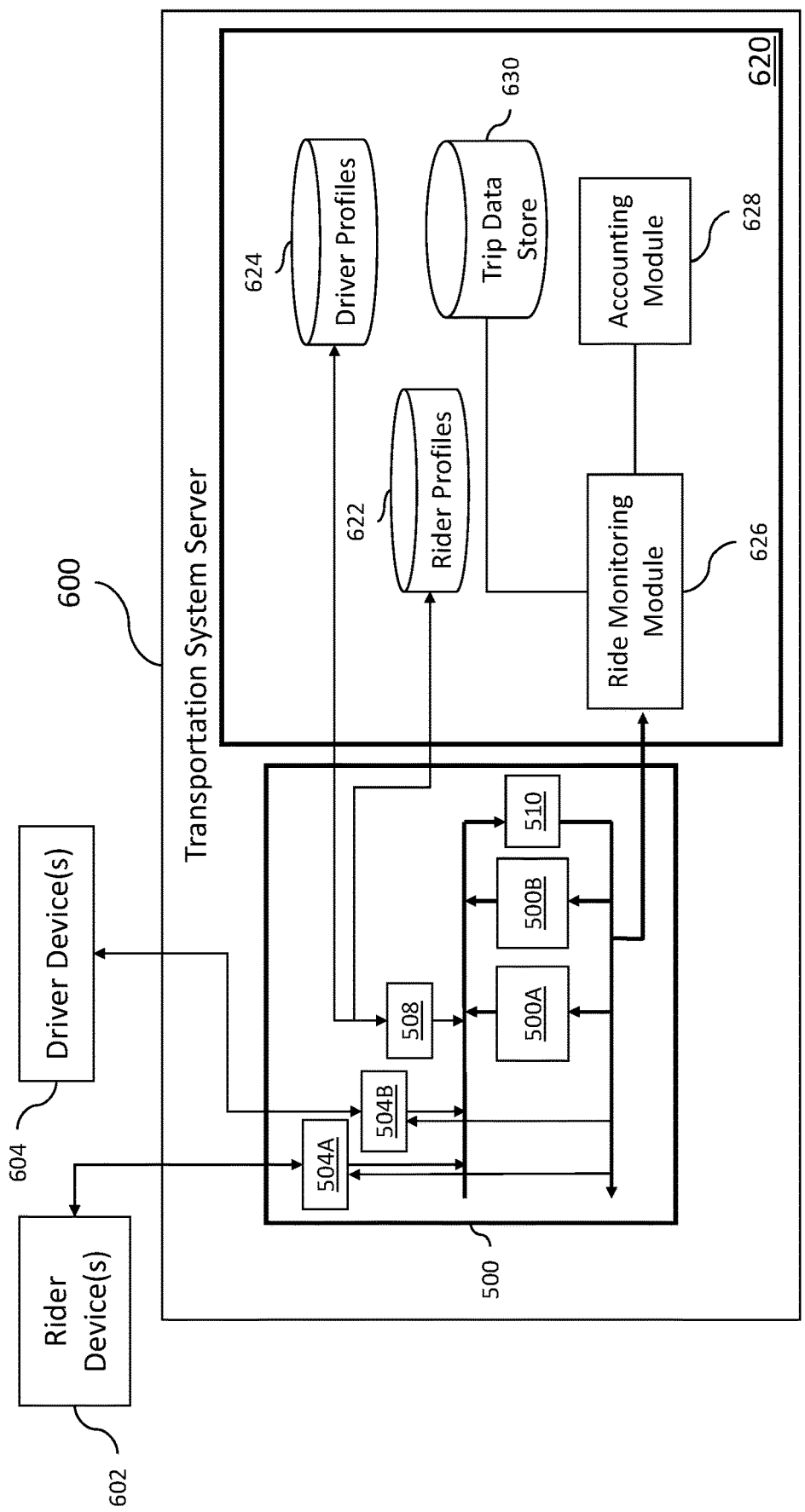
FIG. 6A is a diagram in which the system of FIG. 5A is used to implement a ride matching system according to certain example embodiments.
Figure 6B:
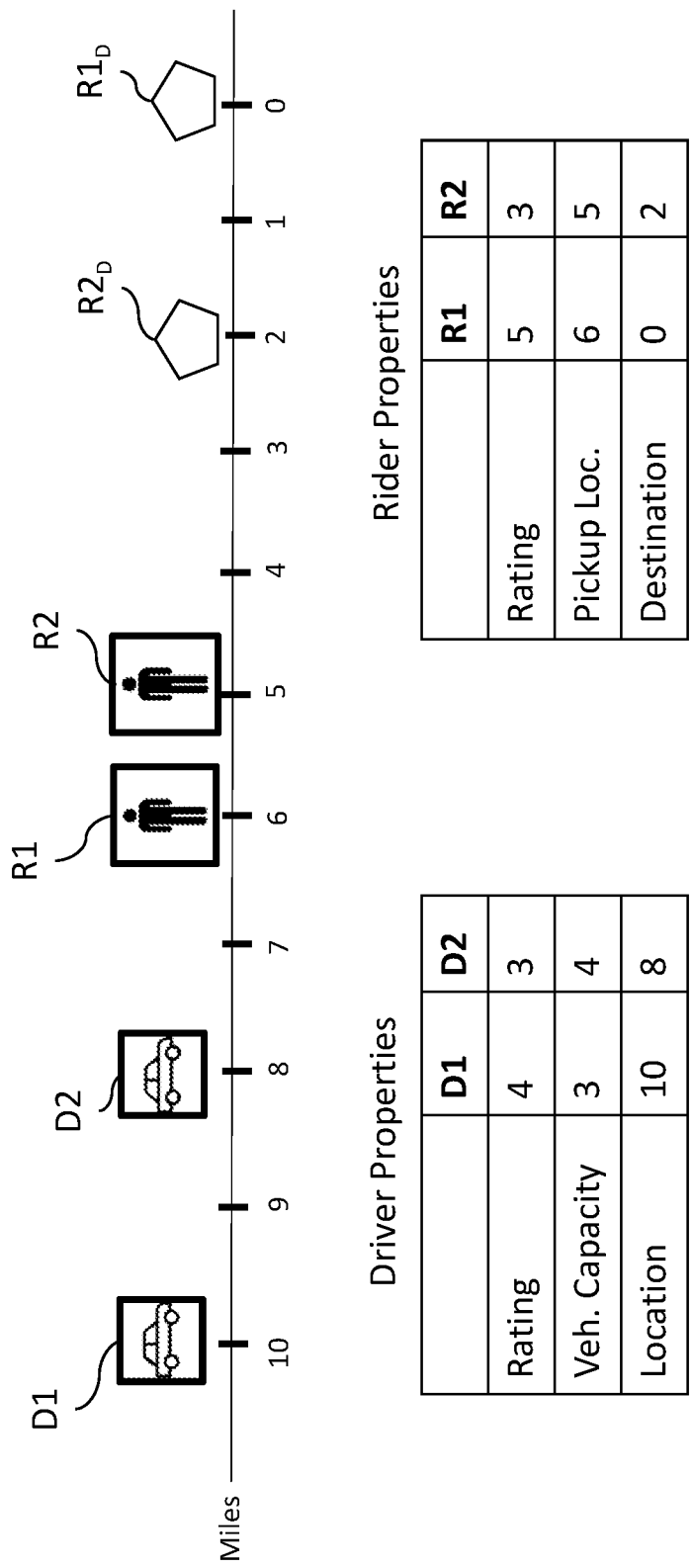
FIG. 6B illustrates an example of how the system in FIG. 6A may operate according to certain example embodiments.
Figure 7A:
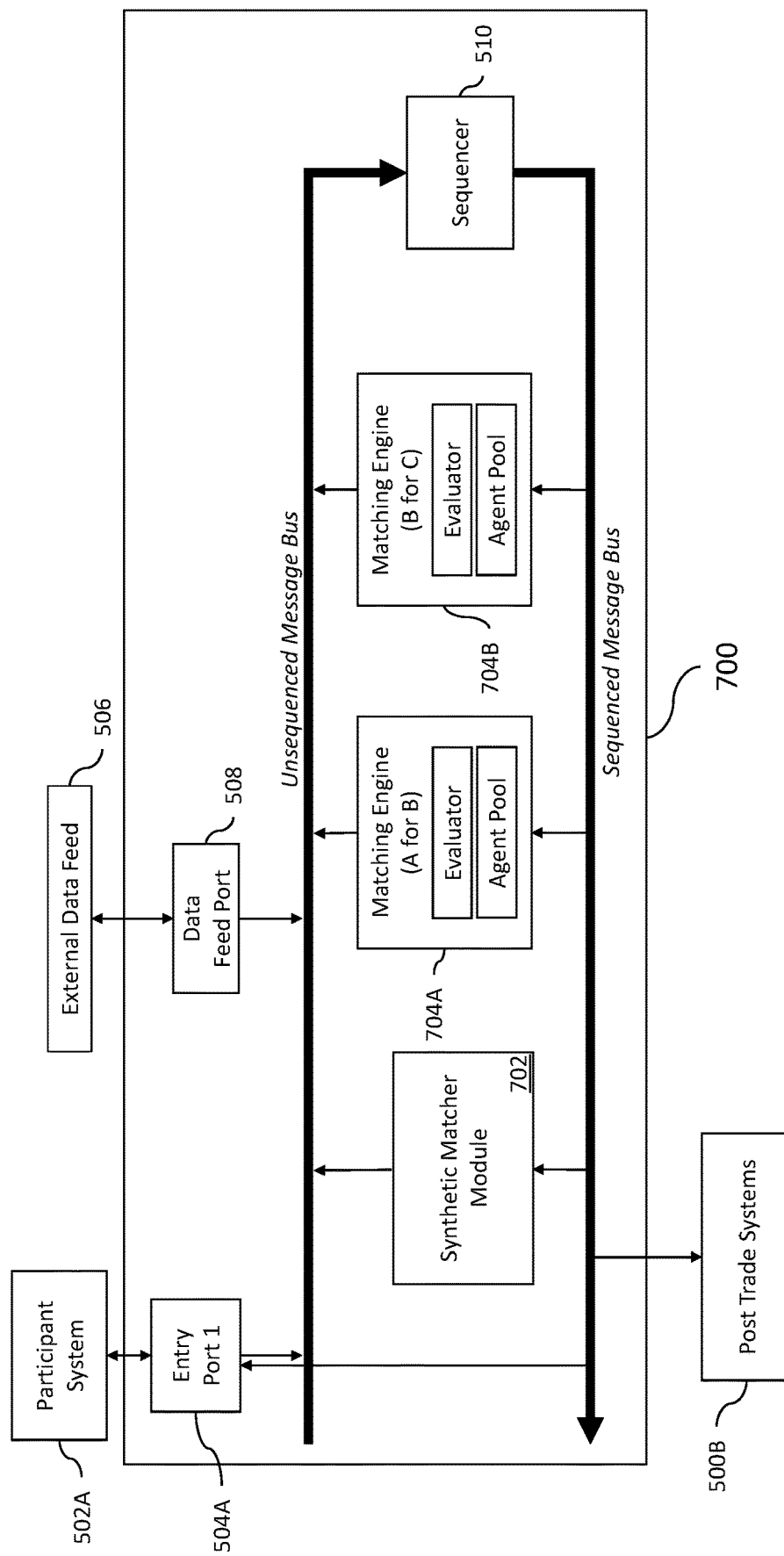
FIG. 7A is a diagram of how certain example systems may be modified to provide for the construction of synthetic matches according to certain example embodiments.
Figure 7B:
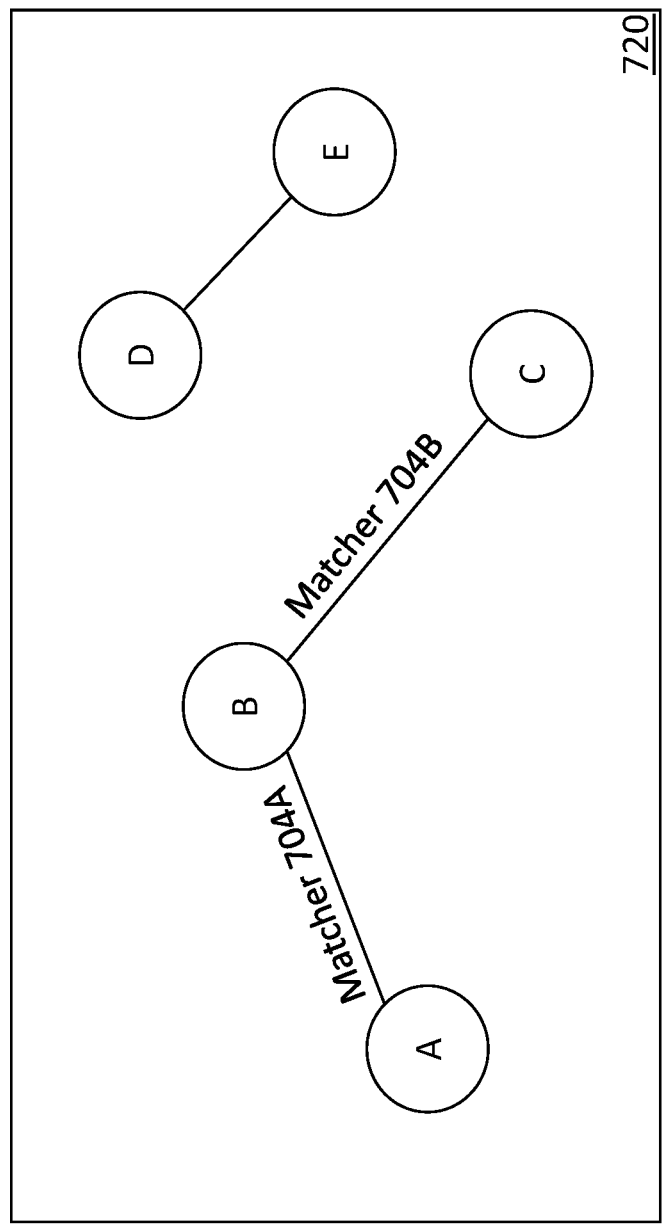
FIG. 7B is an example of how the details of the matching engines may be stored by the synthetic matcher module of FIG. 7A according to certain example embodiments.
Figure 8:
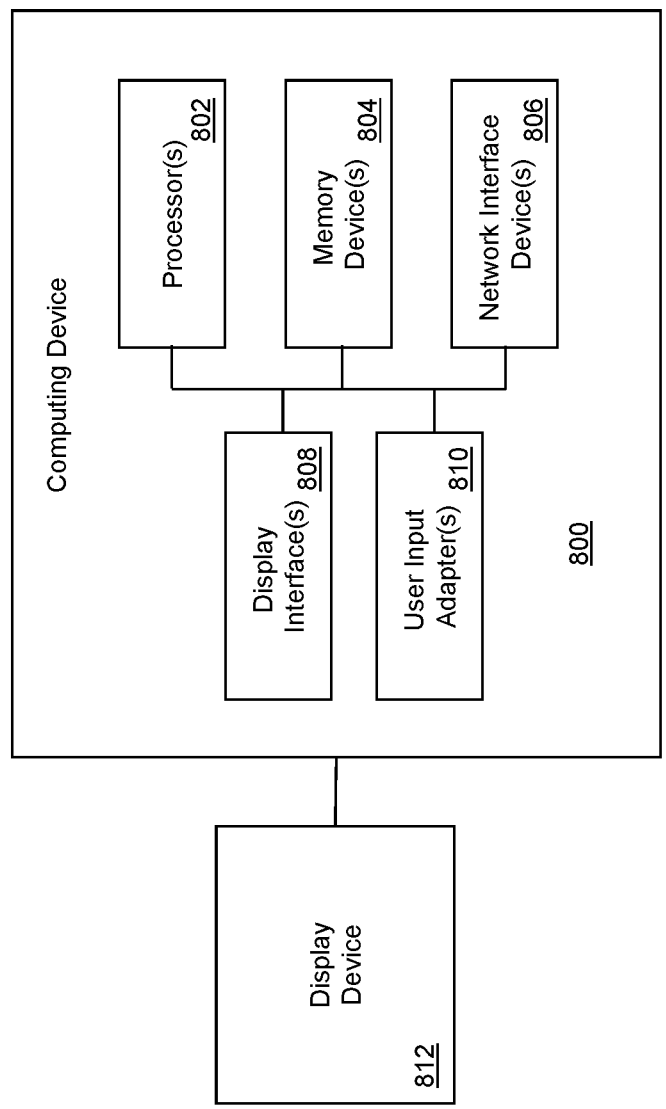
FIG. 8 shows an example computing device that may be used in some embodiments to implement features described herein.

FIG. 1 shows an example system architecture, which may implement the process shown in FIG. 3. FIG. 2A shows example data structures that store the parameters and values that are used by customizable data transaction requests and FIG. 2B shows example customizable data transaction requests (also called agents herein). FIGS. 4 and 5 are block diagrams of example system architectures that may implement the process shown in FIG. 3. FIG. 6A is a block diagram of a ride-sharing system architecture and FIG. 6B is an illustrative example of how evaluations of ride-sharing agents may be performed. FIG. 7A shows an example system architecture that can be used to process synthetic matches. FIG. 7B is an illustrative example for how a data structure may be used to store the different matching engine that are implemented in an example system. FIG. 8 shows an example computing device that may be used to implement the system (or components thereof) in FIGS. 1, 4, 5, 6A, 7A, the process shown in FIG. 3, and/or store the data structure of FIGS. 2A, 2B, and 7B.

In many places in this document, including but not limited to the description of FIGS. 1, 4, 5, 6A, and 7A, software modules and actions performed by software modules are described. This is done for ease of description; it should be understood that, whenever it is described in this document that a software module performs any action, the action is in actuality performed by underlying hardware elements (such as a processor and a memory device) according to the instructions that comprise the software module. Further details regarding this are provided below in, among other places, the description of FIG. 8.

Description of FIG. 1

FIG. 1 is a diagram for an example computer system that handles customizable data transaction requests according to certain example embodiments.

Computer system 100 includes one or more computing nodes or computing devices (e.g., one or more of computing device 800 in FIG. 8). Computer system 100 may function as a universal market system or platform which gives participants the ability to configure or customize the type of resource they wish to offer and what type(s) of resources they wish to receive in return. Participants may define custom valuation functions for each resource with respect to (potentially) any other resource. For example, a participant may define apples in terms of a number of rounds of golf played (or vice versa) or oranges in terms of tickets to a sporting event.

Computer system 100 is configured to receive electronic data messages transmitted from participant computer systems 1 (102) and 2 (104). Participant computer systems 1 (102) and 2 (104) are also configured to interface (using electronic data messages) with computer system 100 to define valuation templates and/or agents. The transmitted messages can include customizable data transaction requests (also called agents herein) and/or data that may be used to form such requests. For example, one electronic data message may include or specify a type of resource (e.g., Honey Crisp apples) that is to be used in a subsequently generated customizable data transaction request. Another electronic message may include or specify another property (e.g., the size of the apples) of the subsequently generated customizable data transaction request. In certain examples, this data may be included in one or more electronic data messages.

In certain examples, participant computer systems are automated computer systems that operate (e.g., to communicate with the computer system 100) without manual user input. Such an automated system may, for example, automatically submit agents to the computer system 100 for processing.

Electronic data messages that are communicated from participant computer systems 102 and 104 are received via network interface 106 of the computer system 100. Network interface 106 may include a gateway or other port oriented device that is used to facilitate electronic communication between participant computer systems and computer system 100. An example of network interface 106 is network interface device 806 in FIG. 8.

Data that is received from participant computer systems may be subsequently stored to data store 108. Data store 108 may be a database (e.g., a relational database management system) or the like. Data store 108 may store data in a structured or unstructured form. The data store 108 may be stored in memory device 804 as shown in FIG. 8.

In certain examples, data store 108 may store multiple defined instances of the template data structure 202 that is shown in FIG. 2 and discussed below. Each instance may be, for example, a different valuation template (212). Different instances of a defined template may then be used within or as one or more agents (220) that are submitted by participants that are also stored within data store 108.

Template generator 109 is configured to provide an interface for participants to define valuation templates 212 that are used by computing system 100. Template generator 109 is configured to allow for customization and flexibility in defining the valuation templates.

In order to facilitate a common basis for exchange, participants may agree to a common unit of exchange for the resources being transacted. In certain examples, a fixed quantity of one resource may be designated with the quantity of the contra-sided resource left variable. For example, an exchange involving apples and water may designate a unit of exchange of apples per gallon (a unit) of water (the contra-sided resource). In this example, water is deemed the fixed-quantity resource (one gallon) and apples are the variable-quantity resource.

It will be appreciated that the selection of a fixed-quantity resource may only be "fixed" for the purpose of establishing a common valuation basis between participants (or the agents thereof). For example, when a transaction is established or a match identified, then a multiple of the fixed resource may be used in finalizing the transaction between the participants. For example, a match may occur between participants based on a valuation of 4 apples per gallon of water, but the actual transaction that is established between the participants may exchange 10 gallons of water for 40 apples, as specified by the participants.

One aspect of defining valuation templates (as discussed below) includes defining a valuation function. A valuation function is a function written in terms of the properties of the acquired resource that yields a quantity of the variable-quantity resource in accordance with the agreed upon unit of exchange. A valuation function may thus be a mathematical function or equation that is used to determine a value (a number) as a function of one or other numerical values or properties. For example, a first participant who is seeking to acquire water and relinquish apples may define a valuation function of $V=10*purity*\{1.0$ for spring, $0.7$ for purified$\}$. The function yields the quantity of apples (the variable-quantity resource) that the first participant is willing to relinquish in exchange for one gallon of water. The specific number of apples the first participant is willing to relinquish may vary with the specific values of the properties of water used in the defined valuation function. Conversely, a second participant may be seeking to acquire apples and relinquish water. The second participant also may define a valuation function in terms of the resource that is being acquired, such as $V=8*\{1.1$ for Macintosh, $0.8$ for Delicious$\}*size/50$ mm. Similar to the first participant, this valuation function yields a quantity of the variable resource (as per the unit of exchange, which the first and second participants may have agreed upon ahead of time). Since the second participant is acquiring the variable resource, the quantity produced by the function is the number of apples the second participant is seeking to acquire in order to relinquish a gallon of the water being offered.

The template generator 109 may allow participants to define scalar values, numerical properties, custom sets, and other expressions within a given valuation function. Custom sets may include, for example, defining a collection of properties (e.g., different sources for water) and then assigning a valuation factor (e.g., 1 for water from a spring, 0.7 for water that is purified, etc. . . . ) to each of the different members of the collection.

In certain example embodiments, a valuation function may include a quantity parameter. In certain example embodiments, such a quantity parameter may be used to provide a benefit to agents that include larger quantities as part of their agents (e.g., larger quantities of the sought after resources are valued more than smaller quantities).

In certain instances, the same participant may define multiple valuation templates. For example, if a first participant is seeking to match apples to water and there are no other valuation templates defined for such a possible transaction, then the first participant can generate two valuation templates. A first template that expresses the "value" of water (e.g., the first and third functions discussed above) and a second template that expresses the value of apples (e.g., the second function discussed above). This way another participant can use the valuation template created by the first participant to submit an agent (e.g., without having to first define their own valuation template).

In certain examples, participants may also modify or update one or more elements of an already stored valuation function of a template. For example, the second participant may adjust a weighting that is given to Pick Lady apples to be lower while increasing a weighting that is given to Honey crisp. Such modifications may create new valuation templates that are stored to data store 109.

Different valuation templates and the functions therein may thus be generated by template generator 109 according to inputs provided by participants. Each valuation template may be stored into data store 108 and accessed at a later time when participants submit agents that are to be processed by computing system 100. For example, when a participant submits an agent they may select a previously generated valuation template that is stored in data store 108.

Evaluator module 110 is a software module and is configured to perform evaluations for pending agents. The evaluator module 110 is programmed to evaluate the customized valuation functions of each agent using the resource values of a contra sided agent. For example, a first agent may specify a type of apple that is being offered. A second agent may specify a value for apples, which may be in terms of water (e.g., 5 apples per liter). The defined property value of the first agent may then be used to calculate the "value" of the valuation function the of the second agent. The evaluation process may then result a numerical value that is expressed in the agreed upon unit of value (e.g., that both agents agree upon, such as a gallon of water or a bushel of apples). This process may be repeated for all pending agents and/or may be executed each time a new agent is received. In certain examples, the evaluator module may be operated on a timer or other periodic basis (e.g., every second, minute, hour, day, week, etc.).

In certain examples, the evaluator module 110 may use external data sources 111 to calculate the value of an evaluation function for a given agent. For example, the value for a particular resource (e.g., concert or football tickets) may be dependent on the weather. For example, sunny may be given a weight of 1.5 and rainy a weight of 0.5. Thus, the weather may affect the result of a given valuation function that incorporates such data. The external data sources 111 may be remote computer systems that provide data updates (either on the period basis or on demand) to computer system 100.

Once the agents are evaluated, then the valuations for the agents (or the functions of those agents) may be matched against contra sided evaluated agents via matching engine 112. In other words, if the calculated values of contra-sided agents are compatible (or match) then a match may be identified. For example, if the X would give 5 apples for a gallon of water and Y requires 4 apples for a gallon of water then a match may be identified between those two evaluated agents. Conversely, if the X would give 5 apples for a gallon of water and Y requires 6 apples for a gallon of water, then no match would be identified by the matching engine 112.

Description of FIGS. 2A-2B

FIG. 2A illustrates example data structures that may be used by the computer system shown in FIG. 1 to handle customizable data transaction requests (also called agents herein). Data structures include template data structure 202, valuation template 212, offered resource data structure 214, and an agent data structure 220 (agent).

The template data structure 202 may include the minimum requirements for a participant to generate a valuation template. The requirements may include a resource identifier 204 of the resource to be acquired, a resource identifier 206 of the resource being relinquished, a function 208 or expression of how the resource that is being acquired (204) will be valued, the unit of exchange 210 to express the value of the function 208, and properties of the resource being relinquished. Other elements may also be included. An example usage of the template data structure 202 to create a valuation template is shown as 212.

AcquireResourceID 204 and RelinquishResourceID 206 may be any of the resource identifiers for the different resources that are eligible to be valued by the computer system 100. The resource to be acquired 204 may also be a resource that is being sought, obtained, received, bought, or the like by the participant. The resource that is being relinquished may be a resource that is being conveyed, transmitted, divested, offered, sold, posted, listed, or the like by the participant.

Resources can include traditional commodities, goods, resources, or assets (e.g., water, apples, stocks, oil, securities, land, etc. . . . ), services (e.g., lawn mowing, cab rides, software development work, etc. . . . ), and promises to perform a service or deliver a resource (e.g., options, etc. . . . ). Virtually any type of good or service may be used as a "resource" according to the example embodiments described herein. Resources may also be termed or viewed as "items" that are being matched using the example techniques as described herein. Such resources may be referred to by an identifier for that resource (e.g., that is generated when a definition for that resource is added to a database). In the example valuation template 212, the ID for apples is the acquire resource ID (the resource that the participant wants to acquire) and the ID for water is the relinquish resource ID (the resource that the participant is relinquishing or giving up in exchange).

Apples 204a and water 206a are used, respectively, as examples of a resource that is to be acquired and relinquished.

Quantitative function 208 is the function (e.g., defined by the participant creating the valuation template) that will be used in determining the "value" of the resource that is being sought (with the "value" being defined in terms of the unit of exchange 210). In general, any type of data may be used to determine the value of a resource. However, the individual data elements of the function may be required to be reducible to some numerical value. Data may be based on the characteristics of the resource being sought (e.g., the size of the apples, the type, the graded quality, the age from when they were picked, the location of the orchard, etc. . . . ) or other factors. Other factors may include, for example, a distance (e.g., between the orchard and destination), the weather at a particular location (e.g., the orchard or elsewhere), the amount of ice cream purchased in the last quarter in a given state, etc. . . . In general, characteristics of the resource being sought will be supplied by the participant offering the resource while data for the external factors may be supplied from external data source 111 (or computer system 100).

An example of the quantitative function 208 is valuation function 208a that defined the "value" for apples as {11.1 for mac, 0.8 for delicious}*size/50 mm. This example valuation function includes two attributes (the type of apple and the size of the apple) and a scalar value of "8." In certain instances other parameters and/or values may be included in the valuation function. For example, some parameters may rely on external data from data source 111. External data may include the current location of a person (e.g., who may be a participant). In certain examples, the current location of the person may be acquired using a GPS signal or the like.

In certain examples, each of the different attributes, properties, or other elements for the Quantitative Function 208 may be tokenized and separately stored (e.g., in data store 108) in connection with the resource for which the function is associated. This may allow future participants to easily query or discover which properties are being used to value a given resource. In the example shown in FIG. 2A, the type of apple and size would be tokenized and separately stored as possible properties for apples. This may allow those that are offering apples as part of future submitted agents (discussed below) to determine what properties to include in the submitted agent and/or the valuation template that is used for the agent.

In certain examples, function 208 may include conditional or logical elements. For example, a function may specify that peaches or apples are desired and provide a valuation for both within the same function—e.g., V=isPeaches*(peaches valuation)+isApples*(apples valuation). Such an function may then zero out the peaches or apples part of the function depending on whether peaches or apples are being supplied by the counter-party agent. Other more complex evaluation elements and functions are also possible such as logical structures, conditional structures, programming scripts, etc. In certain examples, the valuation function may be defined in, for example, a programming language or the like such as python, Java, C/C++, javascript, etc. Thus, the valuation functions may be expressed in mathematical terms and/or with programming elements.

Returning to the example template data structure 202, unit of exchange 210 property may be required to indicate how the resource being acquired is being measured (e.g., what is the "unit" of the value that is calculated as a result of evaluating function 208). In general, for two opposing agents to match, the unit of exchange 210 that is specified must be the same. In certain examples, the resource being acquired may be defined in terms of a unit of the resource being relinquished while a contra-sided agent using a valuation template may define the resource being relinquished in terms of a same unit of the resource being acquired. An example in valuation function 208a is a gallon of water. In other words, the apples in the valuation template 212 will be quoted as per of unit water and the unit will be gallons. Thus, the valuation that is produced when the valuation function 208a is evaluated (e.g., by evaluator module 110) is in apples per gallon of water. Similarly, a valuation template where water is being acquired and apples being relinquished will also have a unit of exchange that specifies a gallon of water (e.g., such that "value" of the water is also in terms of gallons of water). Note, the unit of exchange defined for a given valuation template may be up to the participant such that valuation function 208a may be defined in terms of, for example, water per bushel of apples.

In certain examples, as explained below, different units may be used for contra-sided agents and matches may still be identified if such units have a preexisting relationship. For example, one agent may use liters of water as the unit of exchange and another agent may use gallons of water as the unit of exchange. In such an example, the computer system may convert the "units" of one agent into the units of another as there is a known conversion between liters and gallons of water.

In certain example embodiments, the computer system 100 may determine those agents that are eligible to match against one another by selecting all of the agents that have the same unit of exchange (or all unit of exchanges that are compatible with one another—such as feet and inches).

Generally, the unit of exchange will be tied to the resource being acquired or relinquished. However, in certain example embodiments, the unit of exchange may be related to another resource. For example, the acquired (e.g., oranges) and relinquished (e.g., apples) resource may be defined in terms of dollars.

Template data structure 202 also includes a data field 211 for the properties of the resource that is to be relinquished in exchange for the resource that is to be acquired. In certain examples, this may be the relinquish resource data structure 214 that allows participants to indicate tuples of property type, value for the resource that is being relinquished.

In the example valuation template 212, the properties of the water that is being relinquished are Purity=0.8, Source=spring. In certain examples, the valuation template may allow a participant to store a list of options for a given property type that may then be selected when an agent 220 is created based on the valuation template. In other examples, the valuation template may require specification of the properties of the resource that is to be relinquished (as opposed to the possible properties of the resource to be relinquished).

In certain examples, the template data structure may also include fields for defining the units of the resource that is being sought and the resource that is being offered. For example, a valuation template may define that water is defined in gallons or that apples are defined for each apple (or each bushel of apples).

As noted above, the relinquished resource data structure 214 may include properties for a given resource that will be relinquished by a participant. The relinquished resource data structure may include a field 216 for a resource ID of a resource that is being relinquished and a field for a collection of <type, value> pairs 218, with the type being a specific property and the value being the value of that property for the selected resource. For example, if water is being relinquished then a property of the offered water may be the purity of the water. This may be expressed in, for example a percentage or a number between 0 to 1. Another property may be the source of the water. The value for this property may be one of multiple possible options, such as, for example, spring sourced, purified, etc.

In certain example embodiments, a valuation template 212 may also include a requirement, field, or property on the total quantity of a resource that is to be matched. In certain examples, a quantity field may be added to the template data structure 202 and then filed in when a valuation template 212 is created. An example valuation template may include a quantity property of 500 gallons of water. The quantity information may then be used at or after the rate of exchange between two contra-sided agents is determined. As discussed in greater detail below, users may also specify quantity when an agent is created (e.g., an agent to match 500 gallons of water as defined in the agent).

As noted above, different properties regarding resources may be discoverable as a result of their inclusion into one or more functions 208 that have been included into already created valuation templates. Thus, when a participant is generating an instance of an offered resource data structure 214 and selects a given resource to offer, the discoverable property types for that resource may be displayed or otherwise made available to the user or participant. Such an implementation may allow participants to include details, attributes, characteristics, etc. . . . of the offered resource that are of interest to those participants that are interested in trading in that resource.

In certain examples, participants may add their own characteristics. In certain instances, participants may include many different attributes or characteristics as different potential counter-participants may be interested in different attributes. For example, one participant may want any type of apple from Washington State and thus the source of the apples may be property. Another participant may want Granny Smith Apples and another may want apples that are larger than 60 mm. A participant may thus include all of the attributes into an offered resource data structure 214 that is used with a valuation template 212.

Agents 220 are an example of a "customizable data transaction request" and are submitted by participants for evaluation and possible matching by the computer system 100. Agents can be viewed as instances of valuation templates that have been submitted by a specific participant for evaluation and possible matching. Agents are, in certain example embodiments, a data structure (i.e., an "agent data structure") that includes: 1) a valuation function for calculation of a value of a counter party item (e.g., a first item or resource), 2) one or more properties of another item (e.g., a second item or resource), and/or 3) a quantity value that will be used after a rate for a match has been determined.

Different agent examples are shown in FIG. 2B. Agents 250, 260, 270, and 280 are all for a water/apple exchange and all include different valuation functions, which are represented by the "V" line. The agents also include data to represent the offered resource data structure 214 that is included with the selected agent. For example, Agent 280 has an offered resource data structure 214 that is for water with a collection of properties for water being <purity, 70%>, <Source, Purified>. All of the agents in FIG. 2B have specified a common unit of exchange—gallon for valuing the respective valuation functions.

The agents shown in FIG. 2B are used as examples to describe features of the example embodiments described herein (e.g., in connection with FIG. 3).

It will be appreciated that other types resources are also possible. For example, cash or money may be one resource with quantity and currency type being properties of the money resource. Securities (e.g., stocks, bonds, etc. . . . ) may also be resources as understood herein. In such an example, the stock may have parameters such as, for example, the type of share (e.g., class). In certain examples, an agent may include a total quantity of the offered resource as a parameter. For example, agent 270 may include a quantity parameter of 2000 gallons of water as defined in that agent. In certain example embodiments, the quantity of the resource may itself be a property that may be used by a contra-sided agent in its evaluation function.

Description of FIG. 3

FIG. 3 is an example process that is used by the system in FIG. 1 to process and/or handle customizable data transaction requests according to certain example embodiments.

At 302, the valuation templates (e.g., 212) that will be used in creating the agents may be defined. For example, a participant system may send electronic data messages that defines a type of resource (apples) and sub-types of apples (Macintosh and Delicious). In certain examples, the quality value for the particular resource may also be provided. For example, the size of the apples may be a quality value.

This step may also include defining the unit of exchange that will be used for the valuation template. In other words, for a given match that is being sought between two different resources, what resource or unit will be the standard such that a first resource (e.g., apples) is quoted in the amount of the second resource (e.g., water). Accordingly, in the apples/water example, a number of apples is defined in terms of, for example, 1 gallon (a unit) of water. Thus, when an agent is submitted that specifies apples, the units (e.g., the calculation from the value function of the valuation template) being offered will be understood as apples per gallon.

At 304, the defined valuation templates (e.g., 212) are stored to the computer system 100.

At 306, generated agents are received from participants. As discussed above, the agents may be instantiations of a selected valuation template (e.g., 212). Example agents are shown in FIG. 2B.

The reception of agents may continue for a period of time. For example, agents may be submitted for 1 hour before the process shown in FIG. 3 proceeds away from 306. In certain examples, the process proceeds to 308 upon reception of each agent.

At 308 and 310 the agents are evaluated. In certain examples, the evaluation processes of 308 and 310 is an atomic process 316 that is performed by the computer system 100. For example, the evaluations performed in 308 and 310 are performed using the same snapshot or dataset throughout 316. In certain examples, 308 and 310 are sequential operations that are performed within 316. In other examples, 308 and 310 may be performed concurrently within 316. In other examples, 310 may be performed first and then 308. In any event, at 308 the valuation functions from one "side" of the agents (e.g., a group or set of agents that are in the agent pool) are evaluated using the values of the properties from the other "side" of the agents (e.g., a second group or set). This is also referred to as a pair-wise evaluation of the agents in certain example embodiments. Thus, using the agents shown in FIG. 2B as an example, the value of agent 250 (e.g., the result of evaluating the valuation function of that agent) is calculated using the offered property values of agent 260 and 280 (from the second group). This evaluation results in multiple results, one result for evaluating the valuation function of 250 using the offered property values of agent 260 and another result for evaluating the valuation function of 250 using the offered property values of agent 280. Similarly, the value of agent 260 (e.g., its valuation function) is calculated using the offered property values of agent 260 and 280.

Accordingly, in 308 using the example agents from FIG. 2B the results of one side of the pairwise calculation of the agents (e.g., their valuations functions) is as follows: 1) Agent 250 would be willing to give 5 apples for 1 gallon of Agent 260's water; 2) Agent 250 would be willing to give 4 apples for 1 gallon of Agent 280's water; 3) Agent 270 would be willing to give 6 of his apples for 1 gallon of 260's water; and 4) Agent 270 would be willing to give 5 of his apples for 1 gallon of Agent 280's water. It will be appreciated that the fact that 250 will give 5 apples for 260's water but a lesser amount, 4 apples, for 280's water does not indicate a preference on 250 part to trade with 260. Specifically, 260 and 280 have different quality water and 250 has specified how many apples would be a fair exchange for each.

At 310, the other "side" of the agents are evaluated. Again, using the example agents from FIG. 2B the results of the other side of the pairwise calculation of the agents (e.g., their valuations functions) is as follows, the following is calculated: 1) 260 requires 8 of 250's apples for one gallon of water; 2) 260 requires 7 of 270's apples for one gallon of water; 3) 280 requires 6 of 250's apples for one gallon of water; and 4) 280 requires 4 of 250's apples for one gallon of water.

In certain instances, a valuation function for a given agent may include a parameter for a property that is not supplied by a contra-sided agent. In such instances, a default value may be used when calculating the valuation function. The default value may be set by the system or the agent that includes a given parameter in their valuation function. For example, if a valuation function defines an apple size parameter, and a counter party agent does not include an apple size property in their agent, then a default value may be used for size (e.g. medium) of the valuation function (where the default value may be set forth within the agent or valuation function). In certain examples, the property may default to the "lowest" or least desirable value. In certain examples, if a counter-party agent does not define a property that is used in an evaluation function, then that agent may be skipped as part of the matching process. In certain examples, parameters of an evaluation function may be labeled as required and if such properties are not supplied, then evaluation may be skipped for that counter-party agent. Conversely, if the parameter is not labeled as required, then a default value may be used.

Once the evaluations are performed (e.g., the pair-wise evaluation is completed), then, at 312, matches may be identified using the results of the evaluations of the agents. In certain examples, all of the evaluations in 316 are performed prior to the processing at 312 starting. In certain examples, however, the processing at 312 may start while the processing in 316 continues. In any event, recall that the agreed unit of exchange for all agents was a gallon of water. Thus, the only match that is possible is between agent 270 and agent 280. Agent 270 would give 5 apples for a gallon of 280's water whereas 280 requires 4 apples from 270 for a gallon of water. It will be appreciated that this is not an exact match (e.g., X would give 5 and Y wants 5). Accordingly, in instances where there is a cross, the computer system 100 may determine the final matching value to be used for these agents to be the lower value (4), the highest value (5), a median value (4.5), the value (4) of the first submitted agent (270)—e.g., first in time, or the evaluated value (5) of later submitted agent. In general, the value may be any number between (or outside) the range established by the two separate evaluations.

In certain examples, multiple different choices may be determined as a result of the matching process (e.g., 270 may be matchable against both 260 and 280). In such occurrences, the computer system 100 may select one of the matches at random (or pseudo random). In certain examples, the first agent received by computer system 100 between 260 and 280 would be selected. In certain examples, agents may be matched on a pro-rata basis. Other types of matching techniques and algorithms may also be employed.

At 314, the match data identified at 312 is disseminated to the participants of the match (e.g., computer systems 102 and 104). In certain examples, when the participants are informed of the match they may then conduct additional processing (e.g., via computer system 100) to agree upon the total quantity for a match. For example, a match may be determined a rate of 5 apples per 1 gallon of water. The participants may subsequently agree to trade 200 apples for 40 gallons of water using the 5 apples to 1 gallon of water rate. In certain examples, no further communication may be needed as the quantity may be open ended (e.g., an indeterminate amount—or not needed in the case of the ride sharing example discussed below). The process may then return to 306 (or 302 or 304) to process additional agents.

As noted above the process of 308, 310, 312, and 314 may be performed in response to the reception or each new agent or may be performed on a periodic basis (e.g., each second, minute, hour, millisecond, etc. . . . ). In certain examples, the evaluations and matching of 308-312 may take a snapshot of the currently available agents and perform the processing for those agents.

In certain examples, the frequency of evaluation of the agents (e.g., in 316) is generally greater than the frequency at which the properties of the agents are changed. Thus, if the properties of the agents are generally slow to change (e.g., on a daily basis), then evaluation may be performed more slowly. Conversely, if the properties of the agents are updatable at a faster rate (e.g., seconds), then the evaluations may be performed more frequently.

Description of FIG. 4

FIG. 4 shows a diagram of an example computer system that is used to evaluate and match agents according to certain example embodiments. In certain examples, the system shown in FIG. 4 may be used to implement other example systems, such as those shown in FIGS. 1, 5, 6A, and 7A.

Clients 402A and 402B may be similar to the participant computer systems described in connection with FIG. 1. Clients 402A and 402B may also be data entry ports (e.g., described in connection with FIG. 5A) that are used by participants to submit agents to the example computer system shown in FIG. 4.

Clients consume or are otherwise provided with item definitions that are stored in data store 404. The item definitions that are stored in data store 404 are the parameters, definitions, or properties of each item that can be referenced or used by the agents and/or valuation template. For example, item definitions that are stored in data store 404 may store all the possible properties of apples (e.g., type, size, date harvested, etc.) that may be used. As discussed herein, different agents and/or valuation templates may use different ones of the properties for a given item (e.g., one agent may use apple type with apple size, and another may just use apple type). In certain examples embodiments, each or any of the properties may have a default value that is used when an agent does not define a different value. The item definitions that are provided to clients 402A and 402B are used to generate agents that are then submitted to matching engine 400.

Matching engine 400 may be an example of matching engine 112 that is discussed in connection with FIG. 1 (or may include the functionality of the matching engine) and may be implemented on, for example, an instance of computing device 800. The agents that are received by the matching engine 400 are stored to agent pool 406.

In certain example embodiments, multiple matching engines may be implemented on an overall computer system and each matching engine may handle different types of potential matches. For example, one matching engine may handle water for apples, another may handle water for oranges, and another may handle dollars for concert tickets. While not expressly required, in certain examples, each matching engine may handle or match two different items. In certain examples, a matching engine may handle multiple different types of matches (e.g., water for apples and water for oranges). In such cases, multiple different agent pools may be used to store the different agents (e.g., one for water for apples and one for water for oranges).

Agent pool 406 may be a data structure that stores a collection of agents that have been submitted to the matching engine 400. For example, the agent pool 406 may be implemented as a two-sided list with one side storing, for example, all apples for water agents (e.g., 250 and 270) and the other side storing the water for apples agents (e.g., 260 and 280). In other examples, all of the agents are maintained within the same data structure (e.g., one list, array, pool, or the like).

Matching engine 400 also includes an evaluator 408 component that is used to perform evaluations for the agents that are stored into the agent pool 406. In certain example embodiments, evaluator 408 may be the evaluator module 110 that is described in connection with FIG. 1. The evaluator 408 is programmed to periodically evaluate the agents. The frequency may be set for each matching engine and/or each evaluator. For example, the frequency of apples for water evaluations may be 5 seconds, whereas a frequency of water for oranges may be 2 seconds. In certain examples, the evaluation is performed in a pair-wise manner such that every agent of a first type is evaluated using the property of each agent of a second type. Thus, for example, agent 250 is evaluated using the values of agents 260 and 280 (e.g., once for each) and agent 260 is evaluated using the values of agent 250 and 270.

The results of the evaluations are then used to determine if a match exists between the agents. If such a match does exist it is then reported to the clients from which the agents originated. In certain example embodiments, once a match is identified, then the clients associated with each agent may further agree on a quantity based on the rate at which the match is determined. In certain examples, the agents themselves may include a quantity value.

Figure 5A:
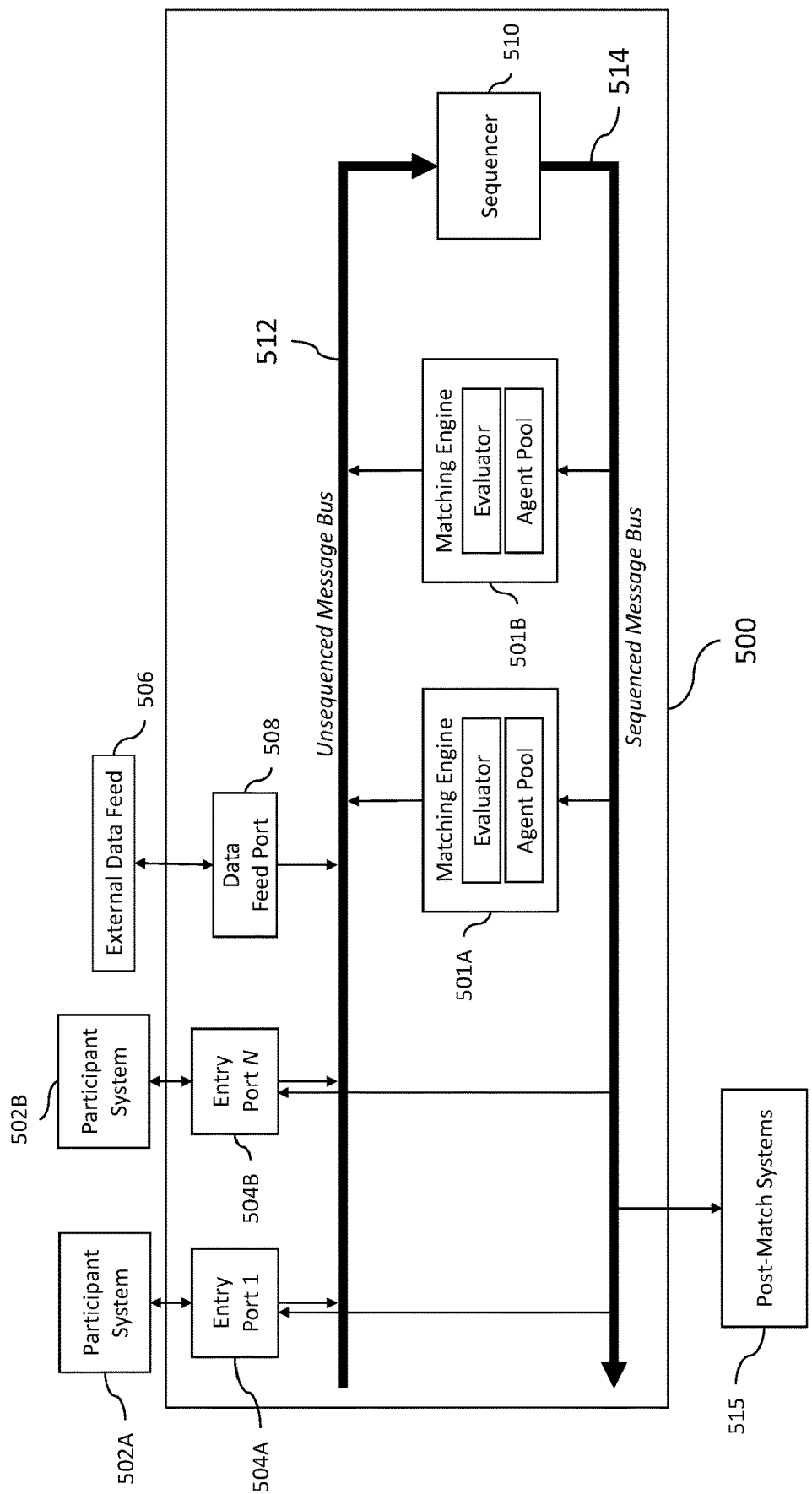
FIG. 5A is a diagram of another example computer system that processes agents submitted from client computer system according to certain example embodiments.

Description of FIG. 5A

FIG. 5A is a diagram of another example computer system that processes agents submitted from clients according to certain example embodiments. The system shown in FIG. 5A is an example of how the system shown in FIG. 4 may be implemented in certain instances.

Computer system 500 includes one or more computing nodes (e.g., multiple instances of computing device 800). Computer system 500 includes matching engines 501A and 501B, entry ports 504A and 504B, data feed port 508, and sequencer service 510, each of which may be a computer process (e.g., a computer application). In certain examples, the functionality provided by these components may be provided in hardware (e.g., via an FPGA or an ASIC). Each or any of the elements of computing system 500 may be implemented on individual computing nodes (e.g., computing device 800). The computer system 500 may be implemented in a cloud-computing environment.

Participant systems 502A and 502B communicate with computer system 500 via entry ports 504A and 504B. Each participant may have a dedicated entry port that is used to communicate with computer system 500. The combination of a participant system and an entry port may be, in certain example embodiments, a client as discussed herein. Each port may be a logical (e.g., similar to or the same as port numbers in TCP or UDP protocols) or physical port (e.g., a different physical link) that is used for communicating (e.g., via a network interface) with an external computing system. Each port may be used for both receiving data messages from external computing devices (e.g., that are sent to computing system 500) and transmitting data messages to participant systems 502A/502B (e.g., from computing system 500 to participant systems 502A and 502B).

Accordingly, in this example, participant systems may submit agents to the computing device 500 via their respective entry ports and may also correspondingly receive messages from the computer system 500 that, for example, a match has been identified.

Computer system 500 may also include a data feed port 508 that is used to receive data messages from an external data feed 506. Port 508 is similar to the entry ports in that it may be a logical or physical port of the computer system 500. The external data feed 506 may be a data source that is providing data to the computing system 500 that will be used by one or matching engines. For example, if weather is a property being used by one or more agents, then the external data feed may be a weather service feed that provides weather updates. Other examples of external data feeds are provided in connection with FIG. 6A and the ride sharing example system.

Computer system 500 includes matching engines 501A and 501B, which may be instances of the matching engine 400 from FIG. 4. Computer system 500 includes a sequencer 510 service or process that is used to logically sequence most or all of the messages that are generated externally (e.g., submitted via port 504A) and/or internally (e.g., from matching engine 501A). More specifically, computer system 500 includes an un-sequenced message bus 512 in which any service, module, or component may write message to. The sequencer 510 may then listen to un-sequenced message bus 512 and sequence the messages that are placed onto the bus. Each un-sequenced message may be sequenced by appending a sequence identifier or number to the message to thereby logically sequence the message within the overall computing system 500. The sum total of the sequenced messages of the computing system 500 may be the totally ordered global state of the computing system 500. The sequenced messages are then written by the sequencer 510 to the sequenced message bus 514. Any service, module or component may then listen for messages that written to the sequenced message bus 514 and take appropriate action based on such messages.

The computer system 500 may operate as follows. Participant systems (502A and 502B) supply agents via data messages through entry ports 504A and 504B. For example, a first participant may supply a water for apples agent and a second participant may supply an apples for water agent. External data is also supplied via messages from external data feed 506 and the corresponding data feed port.

All of the messages are written to the un-sequenced message bus 512 and picked up by the sequencer 510 that logically sequences those messages. The sequenced messages are written by the sequencer 510 to the sequenced message bus 514.

The sequenced messages on the sequenced message bus 514 are then picked up and consumed by the respective elements of the computing system. For example, the entry ports 504A/504B may read the sequenced agent data message(s) and send an acknowledgement message to the participant system (e.g., indicating that the originally submitted message with the agent has been processed by the system). The matching engines 501A and 501B may also read the same sequenced messages and, if the agent is appropriate for that matching engine (e.g., if the matching engine is supposed to act upon that sequenced message), write or store the agent to the relevant agent pool of that matching engine. Similarly, messages from the external data feed may also be consumed by a relevant matching engine (e.g., and be used by the evaluator module thereof).

Matching engines 501A and 501B then evaluate the agents and publish any results (e.g., the details of any matches) to the un-sequenced message bus. Those messages are then similarly sequenced by the sequence 510 and published to the sequenced message bus. The entry ports and/or the post-match system 515 may then act upon such sequenced messages (e.g., to report a match back to the participant) and/or to handle post-match processing. Examples of post-match systems include clearing computer systems or ride monitoring module 626 from FIG. 6A. In certain example embodiments, post-match systems may also include handling or arranging a trade that is based on the identified rate (e.g., 6 apples for 1 gallon of water being a "rate"). This is shown in Step 4 in FIG. 5D where the quantity of the exchange is determined by using the already calculated rate. In certain examples, the determination of the quantity may be performed automatically (e.g., where the agents themselves include a quantity value) and/or may be determined by prompting for input from the participant computer systems (e.g., a user or a computer application thereon).

As shown in FIG. 5A, multiple matching engines may be included. Indeed, computer system 500 may include hundreds, thousands, or even millions of different matching engine processes (individual instances of a matching engine) that are all handling different possible matches between different items. In certain example embodiments, matching engine processes may be dynamically created and/or destroyed based on need, resource constraints, or the like.

In certain example embodiments, item definitions (and other elements that are defined for each or any agent or valuation template) for the items that may be matched may be stored in a separate data store (e.g., data store 404) and/or may be stored internally for each matching engine. For example, a matching engine that handles water to apples may store item definition information for both water and apples (e.g., the properties of those items that can be used to define a water for apples agent or an apples for water agent). In other examples a separate module is included in computing system 500 that provides a central storage location for the item definitions.

It will be appreciated that computer system 500 is a non-limiting example embodiment and in other instances difference types of computing architectures may be used. For example, an architecture that is based on FIG. 4 may be used that does not include, for example, a sequencer or dedicated data ports. In certain examples, agents that are received by the system may be routed to an appropriate matching engine using, for example, one or more routing rules or the like. In certain examples, a system that matches agents may operate similar to a web site that takes form submissions (e.g., agents) and then provides responsive indications of matches (e.g., via email, text message, or the like).

FIGS. 5B through 5D are code snippets from an example program that may be implemented in an example matching engine (e.g., 501A or 501B) according to certain example embodiments. The code shown in FIGS. 5C and 5D is appended to the end of the code section in FIG. 5B (e.g., the code in FIGS. 5C and 5D is part of the UniversalMarket( ) object). The example is implemented in the Java programming language and uses certain functions of the Java API (e.g., ArrayList). Also included in these code snippets are comments for certain portions of the code (the bolded portions are the non-commented sections). It will be appreciated that other implementations may uses different programming languages or different APIs for implement the example techniques. Further, different programming structures (e.g., loops, conditional steps, etc.) may be used than those used in the example provided in FIGS. 5B-5D.

Description of FIG. 6

FIG. 6A is a diagram in which the system of FIG. 5A is used to implement a ride matching system according to certain example embodiments. Computing system 500 is used to determine matches between agents that are submitted by drivers and riders for the purposes of ridesharing (e.g., Uber, Lyft, etc.). Computing system 500 is incorporated or used by transportation server system 600 that also includes a ridesharing computer system 620.

Ride sharing computer system 620 includes a driver profiles database 624, a rider profiles database 622, a trip data store 620, a ride monitoring module 626, and an accounting module 628. The driver profiles database 624 may store profile information on a driver, such as their rating, the car they drive, etc. The rider profiles database 622 may store profile information for a rider including the credit information, rating information, etc.). Trip data store stores all previously (and/or current) trips that have been taken and monitored by the ride monitoring module 626. This information may be generic (e.g., just distance and time) or more specific (e.g., from X to Y, with details of the route taken). Ride monitoring module 626 monitors the progress of an in-progress ride. This may be accomplished by processing data messages that include positional information (e.g., GPS, etc. . . . ) sent from the rider and/or driver device during an in-progress ride. Accounting module 628 stores the financial details of completed rides and is used to ensure payment from a rider and to a driver is completed and recorded.

In this example, rider devices 602 and driver devices 604 are examples of participant systems that are shown in FIG. 5A and communicate with the computing system 500 via data entry ports 504A and 504B. For example, both the driver and/or rider devices may be mobile devices that are used to arrange for ride-sharing services.

The system shown in FIG. 6A may operate as follows. Each rider may provide user input, to their respective devices 602, that defines one or more properties or parameters for a prospective ride; the device 602 may then generate a valuation function for the prospective ride based on the provided user input. The one or more properties may include 1) a driver rating parameter (e.g., a rider is willing to pay additional amount to get a highly rated driver); 2) a vehicle capacity parameter (e.g., the rider prefers larger vehicles); 3) a wait time parameter (e.g., a rider will pay an additional amount to minimize the wait time until pickup; and/or 4) a weather conditions parameter (e.g., a rider may pay more if it is raining).

Each driver may similarly provide user input to their respective device 604 that defines one or more properties or parameters for the driver, a potential rider, and/or for a trip by one or more potential riders. The device 604 may then generate an agent and valuation function for the potential rider/trip based on the user input. The one or more properties included in the user input (e.g., and used to define a valuation function) may include, for example, 1) rider rating (e.g., driver is willing to give a discount to highly rated riders or will charge more for poorly rated riders); 2) pickup location (e.g., the driver may prefer riders at a pickup point that is nearby; and/or 3) destination (e.g., the driver is nearing end of shift, so prefers riders whose destinations are near his home).

In certain example embodiments, the properties that drivers and/or riders may assign to their valuation functions may be dependent on the properties included in rider profiles 622 and driver profiles 624. In certain examples, the properties for riders and/or drivers may change over time. Such changes may allow for additional properties to be used in valuation functions as those properties are added to the respective profile database. For example, driver profiles may be modified to include a property on whether or not the driver's vehicle is an electric car. When the driver profiles database is updated with such information, they the computing system 500 may automatically present that property to riders when they are constructing their valuation function for their prospective ride.

In addition to properties used by drivers and riders, a unit of exchange may also be defined. As discussed herein, this may be set by the matching service (e.g., the transportation system server) or another entity or computer system. This data may be stored in, for example, data store 404 and/or stored in conjunction with the matching engine that handles matching the two items for which the unit of exchange is defined. As also discussed herein, the unit of exchange is arbitrary and is used to standardize the valuation of each agent. In other words, a unit of exchange is used so that the trading participants have a common expectation of the items to be exchanged. In certain examples, the common unit of exchange may be currency (e.g., dollars), however in other examples (e.g., a water to apples exchange) it may be water per apple (or apples per gallon of water). The unit of exchange sets the "units" that the valuation of the agents in a given matching engine will be expressed in.

For the ride-sharing example in FIG. 6A, the unit of exchange is dollars (or other currency) per ride. Accordingly, a rider's equation (e.g., 208 from FIG. 2A) expresses how many dollars will be paid for a ride from given driver. Conversely, a driver's equation (e.g., 208 from FIG. 2A) expresses how many dollars will be received to drive a given rider.

The following is an example of how a ride-sharing matching process using the example techniques described herein may operate. Certain aspects of this example are illustrated in FIG. 6B.

Riders R1 and R2 provide agents to the transportation system server 600 that define (e.g., using a valuation template) how many dollars they are willing to pay for their desired ride. In certain example embodiments, agents are generated by the computing device (e.g., rider devices 602) that is being used by a rider. For example, a user may use their mobile device to provide user input that expressly defines the valuation function that will be used by the agent for that user. The definition of a valuation function for a specific agent may include the user defining a valuation template (using user provided input) and then using that defined valuation template when a specific agent is generated and submitted from the user's mobile device. For example, a user could save two different valuation template. One that values less wait time and one that does not include wait time in the valuation function. When the user then creates a given agent they may use the appropriate template (e.g., by providing input to select the template). In certain examples, valuation templates may be provided to the user (e.g., their computing device) from another sources. For example, users may share valuation templates or transportation system server 600 may deliver common or suggested valuation templates to the user's computing device for use in creating agents therefrom.

In certain example embodiments, the valuations functions that are created for a given agent may be created on a computing device other than the user's computing device. For example, a user may issue an instruction (via their mobile computing device) that they are willing a pay more for a highly rated driver with a larger vehicle. These preferences may then be used to select (e.g., by a computing device that is, for example, part of the transportation system server 600) an appropriate valuation template to use in the creation of an appropriate agent for that user's request. Such an implementation would thus avoid requiring uses enter (potentially) complex equations. A similar type of implementation may also be used on the user's own computing device where the creation of an equation is handled automatically based on specific user preferences (e.g., they value less wait time, etc. . . . ) In any event, the agent is then created and submitted for processing in computer system 500. In this example, the exact nature of the valuation function in the agent may be hidden from the user.

Table 1 shows the two functions that are defined by or for riders R1 and R2. These valuation functions are included in the agents that are transmitted (e.g., as electronic data messages) to the transportation system server 600 from, for example, rider device 602.

TABLE 1

| | |
|---|---|
| R1 | V = (PickupLocationR1 − DestinationR1) + // Trip mileage<br>0.5/(DriverLocation − PickupLocationR1) + // Wait time bonus<br>0.4 * (Vehiclecapacity − 3) + // Large vehicle bonus<br>0.33 * (DriverRating − 4) // Good driver bonus |
| R2 | V = 0.9 * (PickupLocationR2 − DestinationR2) + // Trip mileage<br>0.5/(DriverLocation − PickupLocationR2) + // Wait time bonus<br>0.33 * (DriverRating − 4) // Good driver bonus |

As shown in table 1, while riders R1 and R2 are both riders and both desire ride-sharing services, they also express their valuations of potential rides different. For example, R1 is will to pay more for a larger vehicle, while R2 does not care (at least in terms of the expressed function) about vehicle size. However, R2 desires a lower trip mileage charge than R1 (e.g., by multiplying the distance traveled by 0.9).

Similar to the riders, drivers D1 and D2 also prepare and submit agents that include valuation functions. Examples of such functions are shown in table 2 below. As with the riders, drivers may enter such information using, for example driver devices 604 or the agents (and/or valuation functions thereof) may be created and submitted to the computer system 500 from a computing device that is separate from the driver device 604. The approaches discussed above for riders generating agents may be similarly applied to drivers in certain example embodiments.

TABLE 2

| | |
|---|---|
| D1 | v = (DriverLocationD1 − Destination) + // Total mileage<br>−0.3 * (DriverLocationD1 − PickupLocation) + // Proximity bonus<br>−0.2 * (RiderRating − 3) // Rider Rating bonus |
| D2 | v = 0.80 * (DriverLocationD2 − Destination) + // Total mileage<br>−0.4 * (DriverLocationD2 − PickupLocation) // Proximity bonus |

Each of the agents are received by the transportation system server 600 and are passed to the computer system 500 for processing by at least one the matching engines 501A and 501B (e.g., after being sequenced by sequencer 510). Specifically, the agents are added to the relevant agent pool and then in response to a triggering event all of the agents that are in the pool are evaluated by the evaluator module of the corresponding matching engine.

FIG. 6B illustrates the situation for Drivers D1 and D2 and Riders R1 and R2 when their agents are to be processed by the evaluator of the corresponding matching engine. Note that in certain instances the properties that are to be used for the parameters of each or any of the given valuation functions may be determined at the time of submission of a corresponding agent and/or may be determined at the time of evaluation of the agent. For example, the location property of the valuation function may be supplied by each respective client system and thus may be tied to the submission of the corresponding agent. In other examples, the location that is used to evaluate a given agent may be updated in real-time when the evaluator performs the evaluation. Such information may be retrieved from the corresponding client system that is associated with the agent and/or may be provided from a third party source (e.g., via an external data feed) that is tracking the real-time location of the client system (and thus the rider or driver).

In any event, the properties shown in FIG. 6B represent those that will be used by the evaluator of the matching engine to evaluate each of the agents (e.g., the location of the drivers (D1 and D2 via, for example GPS coordinates of their respective devices), the location of the riders (R1 and R2 via, for example GPS coordinates of their respective devices), and the destination of the riders ($R1_D$ and $R2_D$). In certain example embodiments, the evaluation that is performed by the evaluator is done is pair-wise manner such that each valuation function is evaluated against the properties of each opposing sided agent. Table 3 shows how the evaluator will evaluate the agents that are represented in Tables 1, 2 and FIG. 6B.

TABLE 3

| | |
|---|---|
| #1 | R1\|D1 = (6 − 0) + 0.5/(10 − 6) + 0.4 * (3 − 3) + 0.33 * (4 − 4) = $6.125 |
| #2 | R1\|D2 = (6 − 0) + 0.5/(8 − 6) + 0.4 * (3 − 3) + 0.33 * (3 − 4) = $5.92 |
| #3 | R2\|D1 = 0.9 * (5 − 2) + 0.5/(10 − 5) + 0.33 * (4 − 4) = $2.80 |
| #4 | R2\|D2 = 0.9 * (5 − 2) + 0.5/(8 − 5) + 0.33 * (3 − 4) = $2.536 |
| #5 | D1\|R1 = (10 − 0) − 0.33 * (10 − 6) − (5 − 3) = $6.68 |
| #6 | D1\|R2 = (10 − 2) − 0.33 * (10 − 5) − 0.2 * (3 − 3) = $6.35 |
| #7 | D2\|R1 = 0.80 * (8 − 0) − 0.4 * (8 − 6) = $5.60 |
| #8 | D2\|R2 = 0.80 * (8 − 2) − 0.4 * (8 − 5) = $3.60 |

Once the evaluations are performed, then the matching engine determines if any matches exists based on the performed evaluations. In this example, a match exists between evaluation 2 and evaluation 7 as shown in Table 3 because rider 1 is willing to pay driver 2 $5.92, and driver 2 is willing to accept $5.60.

Once a match is identified the matching engine will report or publish the match to the un-sequenced message bus, which the sequencer 510 will sequence and report over the sequenced message bus. The match will be reported to the rider 1 and driver 2 (e.g., a message is transmitted to the respective rider and driver devices of rider 1 and driver 2) and also reported (e.g., via an electronic message) to the ride monitoring module 626 (e.g., an example of post-match systems 515) that will handle monitoring the (e.g., the pickup of R1 by D2, the ride, and drop off of R1 at R1$_D$) ride. Once the ride is over, then the details of the trip will be stored back to the trip data store and the accounting module will handle debiting R1's account and crediting D2 account. R1 and D2 may also communicate (via their respective computing devices) with ridesharing computer system 620 to, for example, provide ratings for the ride and other ride sharing functionality. Thus, as detailed above, once a match is identified, then the processing is passed off to the ridesharing computer system 620.

In this example, the evaluations are performed with respect to one point in time and assuming a fixed position for the riders and drivers. In other words, all evaluations for one iteration of pairwise evaluations may use properties that are derived from the same point in time. However, in other examples, different time dependent attributes may be used for different agents.

It will be appreciated that the terms used in the valuation functions (e.g., 202) need not be fixed. In certain examples, the terms can be functions of time or functions of other properties that may change over time. Such properties may be included into valuation functions if they can be evaluated by a given matching engine (e.g., if the data for such properties is provided to the matching engine). One example of this may be dropping the value of something as the time approaches midnight (e.g., V=y+F(time)−midnight). Thus, as the time approaches midnight, value drops until V=y. In another example, the value of a car may be based on the current price of steel and rubber. For example, $V=x+S_{steel}(t)+R_{rubber}(t)$.

In certain examples, each or any of the matching engines may operate to "continuously" evaluate the agents (e.g., continuous in that the matching engine runs every 100 ms, every 1 second, every 10 seconds, etc.) that are in the respective agent pool for that matching engine. This can allow for time-varying valuations within the agents that are evaluated.

In other examples, the computer system 500 may interface only with the ridesharing computer system 620. Thus, the riders and drivers may interface with the ridesharing computer system 620, which may then use the services provided by computer system 500 to determine matches between agents submitted for the riders and drivers of the ridesharing computer system 620. Indeed, computer system 500 may operate as a completely separate service that is maintained by a separate organization than the organization that is operating the ridesharing computer system 620.

In certain examples, the computer system 500 may operate many different types of matching engines. One matching engine may handle water for apples, another programming services for concert tickets, and another agents submitted from the ridesharing computer system 620 on behalf of the riders and drivers.

Description of FIGS. 7A-7B

FIG. 7A is a diagram of how certain example computer systems may provide for the construction of synthetic matches according to certain example embodiments. The synthetic matches as discussed herein may be similar to legged orders. However, in certain examples, how such synthetic matches are performed/executed by the computer system may be different from how legged orders are executed in an automated exchanged system.

FIG. 7A includes the computer system 700, which is similar to computer system 500 of FIG. 5A. For example, computer system 700 differs from computer system 500 in that computer system 700 includes a synthetic matcher module 702 (also called a synthetic matching engine or a synthetic matching process), a matching engine 704A (for item A to item B) and a matching engine 704B (for item B to C). Matching engines 704A and 704B may be similar to 501A and 501B discussed in FIG. 5A, except for specifically matching A, B, and C in the manner shown in FIG. 7A. All the other components are the same as those discussed in connection with FIG. 5A.

In this example, there is no matching engine for A to C. However, there are matching engines for A to B and B to C. In such a situation, the synthetic matcher module 702 may receive an act on agent(s) that are submitted for A to C matches or other potential matches that are not expressly handled by computer system 700.

Synthetic matcher module 702 is a computer process that is executed on one or more instances of computing device 800 and includes programmatic instructions for handling synthetic matches. In certain example embodiments, synthetic matcher module 702 is a computer process that is always running (e.g., even when there are no currently pending synthetic matches). In certain example embodiments, synthetic matcher module 702 may be created and destroyed as needed. Thus, for example, computer system 700 may launch or start the synthetic matcher module 702 upon determining that an agent will require a synthetic match. Similarly, computer system 700 may stop or shutdown the synthetic matcher module 702 when no synthetic matches are needed.

In certain example embodiments, the synthetic matcher module 702 may monitor the matching engines that are part of computer system 700. This data may be used to determine what (if any) synthetic matches may be generated. In certain example embodiments, the synthetic matcher module 702 may monitor the sequenced message bus to determine what matching engines are available within computer system 700. Thus, as new matching engines are created or destroyed, the synthetic matcher module 702 may dynamically adjust what synthetic matches are possible. In certain example embodiments, the synthetic matcher module 702 may maintain a list or other data structure of the currently available matching engines and the types of items that they match.

In certain example embodiments, a graph data structure may be used to store the items and the matching engines that are used for those items. An illustrated view of such a graph data structure 720 is shown in FIG. 7B where nodes A, B, and C represent items for which agents thereof are matchable by using the computing system 700. In this example data structure, the matching engines included in computing system 700 are represented in the data structure as the edges between the nodes in the data structure.

The synthetic matcher module 702 may use the data structure as shown in FIG. 7B to store references to the matching engines and the items that are matchable using those matching engines. This information may be used by the synthetic matcher module 702 to dynamically determine what synthetic matches can be generated based on the properties of the data structure. Specifically, a synthetic match may be determined between two items when the corresponding nodes are connected as part of the graph. Thus, a synthetic match may be determined between A and C because nodes A and C are connected along the edges from A to B and B to C. However, no matches are possible between A and E because those two nodes are not connected. It will be appreciated that if, for example, another matching engine between C and E was created, then a synthetic match may generated for any of the items because all nodes would be part of the same graph. In any event, the synthetic matcher module 702 may determine what synthetic matches are possible based on the matching engines and items that are included as part of computer system 500.

When an agent is submitted to computer system 700 and no matching engine is executing matches for that agent, then the synthetic matcher module 702 may determine that it can perform a synthetic match for that agent. In certain examples, agents may be annotated as synthetic by the entry port the receives the agent, the participant computer system that transmits the agent, or another component of the computer system 700. In certain examples, the synthetic matcher module 702 may automatically recognize an agent as being for a synthetic match by comparing it to the stored list (or other data structure) of possible synthetic matches.

In certain example embodiments, the synthetic matcher module 702 will retrieve the agent (e.g., which may have been sequenced by the sequencer 510) and then generate two (or more) sub-agents in accordance with the requirements to carry out the synthetic match. For example, if an agent is A for C, then the synthetic matcher module 702 will generate two sub-agents, one of A for B, and another of B for C. These sub-agents will then be submitted to the appropriate matching engines. In certain examples, from the perspective of the matching engines (e.g., the A to B matching engine and the B to C matching engine), the sub-agents may be similar (or the same) to normal agents that are submitted from participants.

In certain example embodiments, when the sub-agents are submitted or executed, each of the sub-agents may yield enough of the item in question (e.g., B), such that the next match in the "chain" can be matched in order to eventually satisfy the needs of the counter party agent. Thus, for example, a sub-agent of Apples for Water may yield enough water such that the sub-agent of Water for Pears can match for enough Pears to satisfy the original agent (e.g., the original agent that was submitted of Apples for Pears).

The following description is an example of how the system shown in FIG. 7A may operate. Participant system 502A submits agent (agent X) that is A for C. The electronic data message containing agent X is passed through the entry port 504A and placed onto the un-sequenced message bus. In certain example embodiments, the entry port may keep of a list of all operating matching engines and will determine upon accepting the message which matching engine (if any) is to be associated with the newly received message. In this case there is no currently operating matching engines for A to C and thus the entry port may, in certain example embodiments, annotate the message indicating that it is to be handled by the synthetic matcher module 702 (or annotate the message that the matching engine is "unknown" or the like). In certain example embodiments, the entry port may also keep of list of possible synthetic matches. In other words, if the agent is to be handled by an active matching engine (e.g., 704A) then it will be annotated as such. If the agent is to be handled by the synthetic matcher 702, then it will be annotated as such. In certain example embodiments, the entry port may also determine if the system can handle the specific agent. For example, if the agent is A for E, then the entry port may return a message to the participant system indicating that a match is not possible for that agent (e.g., without forwarding the message to the un-sequenced message bus). Thus, in certain example embodiments, the entry port perform additional processing once an agent is received.

After the entry port 504A places agent X onto the un-sequenced message bus, sequencer 510 receives the data message containing agent X and sequences that message and places it onto the sequenced message bus. Matching engines 704A and 704B are listening to the sequenced message bus, but do not pick up the sequenced message containing agent X. This is because matching engine 704A will only process agents that are A to B and matching engine 704B will only process agents that are B to C.

The synthetic matcher module 702 is also listening to the sequenced message bus and based on which synthetic matches are possible (or if the message is annotated as being directed to the synthetic matcher module 702) may accept the sequenced message that includes agent X.

In response to receiving the agent, the synthetic matcher module 702 will then determine which sub-agents to create in order to facilitate a match for agent X. As agent X is A for C, sub-agent Y (A to B) and sub-agent Z (B to C) are automatically generated by the synthetic matcher module 702. The two sub-agents are placed onto the un-sequenced message bus and then sequenced as discussed herein. The sequenced messages with those sub-agents are then picked up by their respective matching engines 704A and 704B and processed as discussed herein. In other words, the sub-agents may operate similar to normal agents that have been submitted by clients.

There are multiple different options for how the sub-agents may be matched.

In certain example embodiments, the matching of the sub-agents may be performed according to a best effort. In this situation, the sub-agents are executed when they are matchable (e.g., without waiting for the other sub-agent). In certain examples, when a sub-agent is matched (e.g. sub-agent Y), then an execution message for that match is placed on the un-sequenced message bus and sequenced to then be picked up by the other matching engine (e.g., for sub-agent Z on the B to C matching engine). Once the other matching engine receives the message that the other sub-agent has been matched, it may start a timer on the as of yet unmatched sub-agent. This timer may be used to require that the as of yet unmatched agent is matched before expiration of the timer. If it is not matched, then the a non-matched message may be placed onto the bus and sequenced. This message may be received by the first matching engine (or another component), which may then cancel or reverse the already matched agent.

In certain example embodiments, a timer that is activated for a match of a sub-agent (or a normal agent) may be used in the valuation function for the agent to determine a match. This may effectively allow an as of yet unmatched agent to value a potential match differently as the timer progresses. For example, the valuation function in table 1 for R1 may be modified such that the first half of the timer the valuation is as stated in table 1. However, if no match has occurred by the time half of the timer has elapsed, then the valuation may be increased (e.g., by an extra 10%). Other modifications are also possible with respect to the elapsed time of the timer. (e.g., linear, logarithmic, exponential, etc.).

In certain examples, modifications based on time or a timer may occur automatically the when sub-agents are created. For example, the synthetic matcher module 702 may customize the valuation functions for the sub-agents before communicating them to their respective matching engines. This may occur for all newly created sub-agents (or at least those that meet a certain criteria) and thus place additional emphasis on finding matches for sub-agents in order to complete a synthetic match.

Another option for handling the matching of sub-agents is to place a hold when a match is found for a sub-agent and then notify the other matching engine that a match has been found. This may again trigger a timer condition for the as of yet unmatched sub-agent. The sub-agent that is on hold may then execute in response to receiving an execution message for that agent. The transmission of the execution message may be based on receiving "match found" messages for all other sub-agents. Thus, for example, each sub-agent for which a match is found may report back to the synthetic matcher module 702 that a match is found. This data may be recorded by the synthetic matcher module 702. When all sub-agents for a given synthetic match have reported matches, then the synthetic matcher module 702 may transmit an execute message that allows for processing of the sub-agents by the respective matching engines in parallel. Conversely, if matches for all sub-agents have not been found, then the synthetic matcher module 702 may transmit a cancel message that causes the matching engines to release the held sub-agents and the held counter-party agents from the hold. The sub-agents may then be removed from the agent pools of the respective matching engines (effectively canceling those agents). In certain example embodiments, a timer may be used by the synthetic matcher module 702 to determine how long to wait before canceling the sub-agents.

Other techniques for synchronizing the execution for the sub-agents may be also be used that may or may not relay on timers. In certain example embodiments, the handling of sub-agents may be transparent to matching engines 704A and 704B. In other words, matching engines 704A and 704B may not know that a sub-agent is part of a synthetic match that is being handled by the synthetic matcher module 702. Thus, sub-agents may be, from the perspective of each matching engine that is handling such agents, the same as agents that are submitted directly from clients. In certain example embodiments, synthetic matcher module 702 may be a "client" as discussed herein.

In certain example embodiments, a matching engine (e.g., 704A or 704B) may include synthetic matcher module 702. For example, computing system 700 may include a matching engine of A for B, B for C, and a separate matching engine for A for C. In such an instance, the A for C matching engine may include functionality for handling agents that have been submitted for A for C or C for A and may also handle creating synthetic trades for A for C agents. This may be accomplished by including the synthetic matcher module 702 into the A for C matching engine. When implemented in such a way, the synthetic matcher module 702 would only handle A for C agents and the generation of sub-agents of A for B and B for C.

Once each of the sub-agents for a synthetic match have been executed, then the synthetic matcher module 702 may report a successful match back to the participant system 502A (via port 504A).

Description of FIG. 8

FIG. 8 is a block diagram of an example computing device 800 (which may also be referred to, for example, as a "computing device," "computer system," or "computing system") according to some embodiments. In some embodiments, the computing device 800 includes one or more of the following: one or more processors 802; one or more memory devices 804; one or more network interface devices 806; one or more display interfaces 808; and one or more user input adapters 810. Additionally, in some embodiments, the computing device 800 is connected to or includes a display device 812. As will be explained below, these elements (e.g., the processors 802, memory devices 804, network interface devices 806, display interfaces 808, user input adapters 810, display device 812) are hardware devices (for example, electronic circuits or combinations of circuits) that are configured to perform various different functions for the computing device 800.

In some embodiments, each or any of the processors 802 (which may also be individually referred to as a "hardware processor") is or includes, for example, a single- or multi-core processor, a microprocessor (e.g., which may be referred to as a "central processing unit (CPU)"), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 802 uses an instruction set architecture such as x86 or Advanced RISC Machine (ARM).

In some embodiments, each or any of the memory devices 804 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 802). Memory devices 804 are examples of non-volatile computer-readable storage media.

In some embodiments, each or any of the network interface devices 806 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 808 is or includes one or more circuits that receive data from the processors 802, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 812, which displays the image data. Alternatively or additionally, in some embodiments, each or any of the display interfaces 808 is or includes, for example, a video card, video adapter, or graphics processing unit (GPU).

In some embodiments, each or any of the user input adapters 810 is or includes one or more circuits that receive and process user input data from one or more user input devices (not shown in FIG. 8) that are included in, attached to, or otherwise in communication with the computing device 800, and that output data based on the received input data to the processors 802. Alternatively or additionally, in some embodiments each or any of the user input adapters 810 is or includes, for example, a PS/2 interface, a USB interface, a touchscreen controller, or the like; and/or the user input adapters 810 facilitates input from user input devices (not shown in FIG. 8) such as, for example, a keyboard, mouse, trackpad, touchscreen, etc.

In some embodiments, the display device 812 may be a Liquid Crystal Display (LCD) display, Light Emitting Diode (LED) display, or other type of display device. In embodiments where the display device 812 is a component of the computing device 800 (e.g., the computing device and the display device are included in a unified housing), the display device 812 may be a touchscreen display or non-touchscreen display. In embodiments where the display device 812 is connected to the computing device 800 (e.g., is external to the computing device 800 and communicates with the computing device 800 via a wire and/or via wireless communication technology), the display device 812 is, for example, an external monitor, projector, television, display screen, etc.

In various embodiments, the computing device 800 includes one, or two, or three, four, or more of each or any of the above-mentioned elements (e.g., the processors 802, memory devices 804, network interface devices 806, display interfaces 808, and user input adapters 810). Alternatively or additionally, in some embodiments, the computing device 800 includes one or more of: a processing system that includes the processors 802; a memory or storage system that includes the memory devices 804; and a network interface system that includes the network interface devices 806.

The computing device 800 may be arranged, in various embodiments, in many different ways. As just one example, the computing device 800 may be arranged such that the processors 802 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 800 may be arranged such that: the processors 802 include two, three, four, five, or more multi-core processors; the network interface devices 806 include a first network interface device that implements Ethernet and a second network interface device that implements WiFi and/or Bluetooth; and the memory devices 804 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of Participant System 1, Participant System 2, computer system 100, network interface 106, template generator 109, evaluator module 110, matching engine 112, and data store 108, matching engine 400, evaluator 408, agent pool 406, clients 402A and 402, data store 404, computer system 500, matching engines 501A and 501B, entry ports 504A and 504B, data feed port 508, sequencer 510, post-match systems 515, ride monitoring module 626, accounting module 628, trip data store 630, rider profiles 622, driver profiles 624, synthetic matcher module 702, each of which will be referred to individually for clarity as a "component" for the remainder of this paragraph, are implemented using an example of the computing device 800 of FIG. 8. In such embodiments, the following applies for each component: (a) the elements of the 800 computing device 800 shown in FIG. 8 (i.e., the one or more processors 802, one or more memory devices 804, one or more network interface devices 806, one or more display interfaces 808, and one or more user input adapters 810), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 804 (e.g., in various embodiments, in a volatile memory device such as a RAM or an instruction register and/or in a non-volatile memory device such as a flash memory or hard disk) and all actions described herein as performed by the software modules are performed by the processors 802 in conjunction with, as appropriate, the other elements in and/or connected to the computing device 800 (i.e., the network interface devices 806, display interfaces 808, user input adapters 810, and/or display device 812); (c) alternatively or additionally, to the extent it is described herein that the component processes and/or otherwise handles data, in some embodiments, such data is stored in the memory devices 804 (e.g., in some embodiments, in a volatile memory device such as a RAM and/or in a non-volatile memory device such as a flash memory or hard disk) and/or is processed/handled by the processors 802 in conjunction, as appropriate, the other elements in and/or connected to the computing device 800 (i.e., the network interface devices 806, display interfaces 808, user input adapters 810, and/or display device 812); (d) alternatively or additionally, in some embodiments, the memory devices 802 store instructions that, when executed by the processors 802, cause the processors 802 to perform, in conjunction with, as appropriate, the other elements in and/or connected to the computing device 800 (i.e., the memory devices 804, network interface devices 806, display interfaces 808, user input adapters 810, and/or display device 812), each or any combination of actions described herein as performed by the component and/or by any software modules described herein as included within the component.

The hardware configurations shown in FIG. 8 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 8, (e) via other hardware arrangements, architectures, and configurations, and/or via combinations of the technology described in (a) through (e).

Technical Advantages of Described Subject Matter

In the technical field of electronic trading systems or automated computer controlled trading systems, prior technology used by such systems possessed some limitations, in terms of the kinds of data transaction requests they could handle. For example, certain systems could only handle transactions where a first party on one side of a transaction would be willing to trade a given amount of currency in exchange for given amounts of an asset and a second party on the other side of the transaction would be willing to trade given amounts of the same asset in exchange for given amounts of the same currency. The technology involved in creating such prior systems (e.g., the software and/or hardware architecture) does not provide the capabilities that would allow for transactions between different assets or transactions that are more customizable. Additionally, in such prior systems, market participants could only express their willingness to trade in simple terms (e.g., in terms of an amount of an asset versus an amount of currency).

The techniques discussed herein provide for a technical improvement to the technical problem of how such systems may be designed, implemented, and/or developed to handle more complex or customizable data transaction requests (e.g., the agent data structures discussed herein).

In certain example embodiments, a framework for handling customizable data transaction requests is provided. The framework allows for increased flexibility in how transactions (e.g., those that may have been too complex in the past to handle) may be handled by a computer system described herein. The certain examples, the customizable data transaction requests may include functions that include mathematical functions, logical functions or structures, programming scripts, or other aspects that may be evaluated by a computer.

The technical features described herein may thus improve how the computer system handles complex data structures and evaluating customizable data transaction requests against one another.

The technical features discussed herein allow for matching processes to be performed for resources, items, or the like for which it would have been previously difficult to perform such matching processes in electronic trading systems due to the arbitrary nature in which those resources or items may have been defined (e.g., because the matching engine of such systems cannot handle data transaction requests that are customizable in the way described herein). The techniques herein may thus allow for matching different types of resources and items where previously such matches would not have been possible in the formalistic manner that is needed for computer systems to perform such matching processes.

According to certain example embodiments, a distributed computer system architecture is provided that allows for many different types of agents to be submitted thereto. This system allows for many different matching processes (e.g. matching engines) to operate independently of one another. This type of system thus can allow for an increased variety of matching engines to operate to thus serve the many different agent types that can be submitted to the system for matching.

According to certain example embodiments, synthetic matches may be generated by automatically generating two or more sub-agents. Such features thus allow for even greater flexibility in designing and implementing a computer system for handling matching of agents.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

It is the express intention not to invoke means plus function treatment for any limitations of any of the claims herein, except for those in which the claim expressly uses the phrase "means for" or "step for" together with an associated function.

Additional Applications of Described Subject Matter

Although process steps, algorithms or the like, including without limitation with reference to FIGS. 3, 5, 6, and 7A, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computer system for matching customizable data transaction requests, the computer system comprising:
a transceiver configured to receive a plurality of data messages for a plurality of agent data structures, wherein each of the plurality agent data structures includes 1) a valuation function that includes at least one parameter for a resource, and 2) at least one property of a different resource;
non-transitory memory configured to store a plurality of resource records that each include a unique resource identifier and data that defines a corresponding resource; and
a plurality of computing nodes configured to communicate with one another via at least one message bus, the plurality of computing nodes comprising computer-executable instructions that, when executed by at least one hardware processor of the plurality of computing nodes, cause the at least one hardware processor to perform operations comprising:
processing the plurality of data messages, where each of the plurality of data messages specify a different one of the plurality of agent data structures, wherein the plurality of agent data structures include a first group of agent data structures and a second group of agent data structures, wherein each one of the first group of the plurality of agent data structures includes plural parameters for each corresponding valuation function for a first resource and plural properties for a second resource that is different from the first resource, wherein each one of the second group of the plurality of agent data structures includes plural parameters for each corresponding valuation function for the second resource and plural properties for the first resource;
transmitting sequenced data messages that are generated by sequencing each one of the plurality of data messages, wherein the sequenced data messages are transmitted using the message bus to other computing nodes;
executing a pair-wise calculation between different ones of the valuation functions of the plurality of agent data structures, the pair-wise calculation of the valuation functions for the first and second group including:
(a) for each corresponding valuation function in the first group, calculating a plurality of first results that are each based on evaluating the corresponding valuation function by using the plural properties from each of the different ones of the second group of the plurality of agent data structures, and
(b) for each corresponding valuation function in the second group, calculating a plurality of second results that are each based on evaluating the corresponding valuation function by using the plural properties from each of the different ones of the first group of the plurality of agent data structures;
based on the pair-wise calculation of the valuation functions for the first group and the second group, determining a match between a first agent data structure, which is included in the first group, and a second agent data structure, which is included in the second group, by determining that a result from the valuation function of the first agent data structure that used the plurality properties of the second agent data structure matches a result from the valuation function of the second agent data structure that used the plural properties of the first agent data structure;
based on the determining of the match, generating match data for the match between at least the first agent data structure and the second agent data structure; and
transmitting a sequenced confirmation match message that is generated based on the determining of the match and the match data that is generated.

2. The computer system of claim 1, wherein the performed operations further include processing external input data received from at least one data source, wherein calculating a result for the corresponding valuation function is further based on the received external input data.

3. The computer system of claim 1, wherein at least one of the corresponding valuation functions includes a variable that changes with respect to time.

4. The computer system of claim 1, wherein the performed operations further include determining, based on determination of the match between the first agent data structure and the second agent data structure, a transaction ratio between the first and second resource.

5. The computer system of claim 4, wherein the confirmation message is further based on the transaction ratio.

6. The computer system of claim 4, wherein the performed operations further include determining a total quantity for transaction based on the transaction ratio.

7. The computer system of claim 1, wherein the performed operations further include transmitting, to different participant computer systems, a list of properties of the first resource that are eligible for valuation function creation for the first resource and a list of properties of the second resource that are eligible for valuation function creation for the second resource.

8. The computer system of claim 1, the performed operations further include:
executing a synthetic matching process that is configured to process a third agent data structure that is between two resources; and
as part of the synthetic matching process and in response to processing of the third agent data structure, automatically generating first and second sub-requests that are both based on the third agent data structure.

9. The computer system of claim 1, wherein execution of the pair-wise calculation is performed on a first computing node of the plurality of computing nodes and each one of the plurality of data messages is sequenced on a second computing node, which is different than the first computing node of the plurality of computing nodes.

10. The computer system of claim 1, wherein the performed operations further include:
executing a plurality of matching engine processes and a sequencer process, wherein a first matching engine process of the plurality of matching engine processes performs the pair-wise calculation of the valuation functions for the first and second group and the sequencer process performs sequencing.

11. The computer system of claim 10, wherein the performed operations further include:
executing a synthetic matching process that is configured to process a third agent data structure that is between two resources;

as part of the synthetic matching process and in response to processing of the third agent data structure, automatically generating first and second sub-requests that are both based on the third agent data structure; and as part of the synthetic matching process, communicating the first and second sub-requests to different ones of the plurality of matching engine processes for matching thereby.

12. The computer system of claim 11, wherein, in response to determining a match for the first sub-request at one of the different ones of the plurality of matching engine processes, the matching engine process that is processing the second sub-request is configured to start a timer to carry out the matching of the second sub-request.

13. The computer system of claim 1, wherein the performed operations further include transmitting a confirmation message, which is based on the sequenced confirmation match message, to participant computer systems that are, respectively, associated with the first agent data structure and the second agent data structure.

14. A method for matching customizable agent data structures, the method comprising:

receiving, from external computer systems, data messages for a plurality of agent data structures;

based on the received data messages, processing, by a computer system that includes a plurality of processing nodes that each include at least one hardware processor, the plurality of agent data structures, wherein each of the plurality agent data structures includes 1) a valuation function that includes at least one parameter for a resource, and 2) at least one property of a different resource, the plurality of agent data structures including a first group of agent data structures and a second group of agent data structures, wherein each one of the first group of the plurality of agent data structures includes plural parameters for each corresponding valuation function for a first resource and plural properties for a second resource that is different from the first resource, wherein each one of the second group of the plurality of agent data structures includes plural parameters for each corresponding valuation function for the second resource and plural properties for the first resource; and generating sequenced data messages based on processing for the plurality of agent data structures, wherein the sequenced data messages are transmitted using a message bus to other computing nodes of the computer system;

executing a pair-wise calculation between different ones of the valuation functions of the plurality of agent data structures, the pair-wise calculation of the valuation functions for the first and second group including:

(a) for each corresponding valuation function in the first group, calculating a plurality of first results that are each based on evaluating the corresponding valuation function by using the plural properties from each of the different ones of the second group of the plurality of agent data structures, and (b) for each corresponding valuation function in the second group, calculating a plurality of second results that are each based on evaluating the corresponding valuation function by using the plural properties from each of the different ones of the first group of the plurality of agent data structures;

based on the pair-wise calculation of the valuation functions for the first group and the second group, determining a match between a first agent data structure, which is included in the first group, and a second agent data structure, which is included in the second group, by determining that a result from the valuation function of the first agent data structure that used the plurality properties of the second agent data structure matches a result from the valuation function of the second agent data structure that used the plural properties of the first agent data structure;

based on the determining the match, generating match data for the match between at least the first agent data structure and the second agent data structure; and transmitting a sequenced confirmation match message that is generated based on determination of the match and the match data.

15. The method of claim 14, further comprising:

processing external input data received from at least one data source, wherein calculating a result for the corresponding valuation function is further based on the received external input data.

16. The method of claim 14, wherein at least one of the corresponding valuation functions includes a variable that changes with respect to time.

17. The method of claim 14, further comprising:

determining, based on determination of the match between the first agent data structure and the second agent data structure, a transaction ratio between the first and second resource.

18. The method of claim 14, further comprising:

executing a synthetic matching process that is configured to process a third agent data structure that is between two resources; and as part of the synthetic matching process and in response to processing of the third agent data structure, automatically generating first and second sub-requests that are both based on the third agent data structure.

19. The method of claim 14, further comprising:

executing a plurality of matching engine processes on different computing nodes of the computer system, wherein a first matching engine process of the plurality of matching engine processes performs the pair-wise calculation of the valuation functions for the first and second group.

20. A non-transitory computer readable storage medium storing computer executable instructions for use with a computer system that includes a plurality of processing nodes that each include at least one hardware processor, the stored computer executable instructions comprising instructions that cause the computer system to perform operations including:

based on data messages, which are received from external computing systems, that are for a plurality of agent data structures, processing the plurality of agent data structures, wherein each of the plurality agent data structures includes 1) a valuation function that includes at least one parameter for a resource, and 2) at least one property of a different resource, the plurality of agent data structures including a first group of agent data structures and a second group of agent data structures, wherein each one of the first group of agent data structures includes plural parameters for each corresponding valuation function for a first resource and plural properties for a second resource that is different from the first resource, wherein each one of the second group of agent data structures includes plural parameters for each corresponding valuation function for the second resource and plural properties for the first resource; and generating sequenced data messages based on processing each of the plurality of agent data structures, wherein the sequenced data messages are transmitted using a message bus to other computing nodes of the computer system;

executing a pair-wise calculation between different ones of the valuation functions of the plurality of agent data structures, the pair-wise calculation of the valuation functions for the first and second group including:
- (a) for each corresponding valuation function in the first group, calculating a plurality of first results that are each based on evaluating the corresponding valuation function by using the plural properties from each of the different ones of the second group of agent data structures, and
- (b) for each corresponding valuation function in the second group, calculating a plurality of second results that are each based on evaluating the corresponding valuation function by using the plural properties from each of the different ones of the first group of agent data structures;

based on the pair-wise calculation of the valuation functions for the first group and the second group, determining a match between a first agent data structure, which is included in the first group, and a second agent data structure, which is included in the second group, by determining that a result from the valuation function of the first agent data structure that used the plural properties of the second agent data structure matches a result from the valuation function of the second agent data structure that used the plural properties of the first agent data structure;

based on the determining the match, generating match data for the match between at least the first agent data structure and the second agent data structure; and transmitting a sequenced confirmation match message that is generated based on determination of the match and the match data.

\* \* \* \* \*